United States Patent
Je et al.

(10) Patent No.: US 11,032,374 B2
(45) Date of Patent: Jun. 8, 2021

(54) ELECTRONIC DEVICE, SERVER AND RECORDING MEDIUM SUPPORTING TASK EXECUTION USING EXTERNAL DEVICE

(71) Applicant: Samsung Electronics Co., Ltd., Suwon-si (KR)

(72) Inventors: Seong Min Je, Suwon-si (KR); Sun Key Lee, Seongnam-si (KR); Kyung Tae Kim, Hwaseong-si (KR); Joo Hwan Kim, Suwon-si (KR); Jae Yung Yeo, Seongnam-si (KR); Kyoung Gu Woo, Seoul (KR); Jeong Hyeon Yun, Suwon-si (KR); Dong Sun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/121,024

(22) Filed: Sep. 4, 2018

(65) Prior Publication Data

US 2019/0075167 A1    Mar. 7, 2019

(30) Foreign Application Priority Data

Sep. 7, 2017   (KR) .................. 10-2017-0114569

(51) Int. Cl.
*G06F 15/173* (2006.01)
*H04L 29/08* (2006.01)
(Continued)

(52) U.S. Cl.
CPC ............ *H04L 67/125* (2013.01); *G06F 3/167* (2013.01); *G06F 9/547* (2013.01); *G10L 15/30* (2013.01);
(Continued)

(58) Field of Classification Search
CPC ........ G06F 3/167; G06F 9/453; G06F 9/4452; G06F 3/0485; G06F 3/04886;
(Continued)

(56) References Cited

U.S. PATENT DOCUMENTS 7,831,930 B2  11/2010  Dresti et al.
7,895,532 B2   2/2011  Scott et al.
(Continued)

FOREIGN PATENT DOCUMENTS

KR    10-2011-0139797 A    12/2011
KR    10-2014-0079328 A     6/2014

OTHER PUBLICATIONS

European Search Report dated Nov. 29, 2018; European Appln. No. 18192760.9-1210.
(Continued)

*Primary Examiner* — Dustin Nguyen
(74) *Attorney, Agent, or Firm* — Jefferson IP Law, LLP

(57) ABSTRACT

An electronic device is provided. The electronic device includes housing, a touch screen display, a microphone, a wireless communication circuit, a processor, and a memory. The memory stores a software program including a user interface supporting the control of at least one external device based on a user account, and the memory stores at least one instruction that, when executed, causes the processor to receive a first user input for connecting the electronic device to a first external device, to receive a second user input corresponding to a request for performing at least part of a task by using the first external device, to receive a first response including a sequence of states from the second external device to perform, by the first external device, the at least part of the task depending on the sequence.

20 Claims, 12 Drawing Sheets

(51) Int. Cl.
  *H04W 76/14* (2018.01)
  *G06F 3/16* (2006.01)
  *G10L 15/30* (2013.01)
  *G06F 9/54* (2006.01)
  *H04W 88/02* (2009.01)
  *G10L 15/22* (2006.01)
  *G10L 15/18* (2013.01)

(52) U.S. Cl.
  CPC ......... *H04W 76/14* (2018.02); *G10L 15/1822* (2013.01); *G10L 2015/223* (2013.01); *G10L 2015/227* (2013.01); *H04W 88/02* (2013.01)

(58) Field of Classification Search
  CPC .... G06F 21/6245; G06F 9/547; G06F 9/5077; G06N 3/006; H04L 12/2816; H04L 61/1535; G10L 15/26
  See application file for complete search history.

(56) References Cited

U.S. PATENT DOCUMENTS

| | | | |
|---|---|---|---|
| 8,015,446 B2 | 9/2011 | Scott et al. | |
| 8,473,865 B2 | 6/2013 | Huang et al. | |
| 9,111,214 B1 | 8/2015 | Sharma et al. | |
| 9,310,976 B2 | 4/2016 | Huang et al. | |
| 9,489,616 B2 | 11/2016 | Sharma et al. | |
| 9,619,283 B2 | 4/2017 | Wu et al. | |
| 9,686,094 B2 | 6/2017 | Kim et al. | |
| 9,697,202 B2 | 7/2017 | Sharma et al. | |
| 9,698,999 B2 | 7/2017 | Mutagi | |
| 9,703,778 B2 | 7/2017 | Sharma et al. | |
| 9,727,213 B2 | 8/2017 | Lilleness et al. | |
| 9,733,804 B2 | 8/2017 | Huang et al. | |
| 9,858,927 B2 | 1/2018 | Williams et al. | |
| 9,947,316 B2 | 4/2018 | Millington et al. | |
| 9,978,260 B2 | 5/2018 | Lee et al. | |
| 10,020,957 B2 | 7/2018 | Kim et al. | |
| 10,031,911 B2 | 7/2018 | Sharma et al. | |
| 10,057,077 B2 | 8/2018 | Fu et al. | |
| 10,168,869 B2 | 1/2019 | Lilleness et al. | |
| 2002/0072914 A1* | 6/2002 | Alshawi ................. G10L 15/26 704/270.1 | |
| 2003/0103088 A1 | 6/2003 | Dresti et al. | |
| 2006/0150120 A1 | 7/2006 | Dresti et al. | |
| 2006/0161865 A1 | 7/2006 | Scott et al. | |
| 2007/0101328 A1 | 5/2007 | Baron et al. | |
| 2007/0136693 A1 | 6/2007 | Lilleness et al. | |
| 2009/0254778 A1 | 10/2009 | Huang et al. | |
| 2010/0313169 A1 | 12/2010 | Huang et al. | |
| 2010/0321201 A1 | 12/2010 | Huang et al. | |
| 2011/0138327 A1 | 6/2011 | Scott et al. | |
| 2013/0152217 A1* | 6/2013 | Park ................. G06F 9/44521 726/29 | |
| 2013/0205216 A1 | 8/2013 | Lilleness et al. | |
| 2013/0205385 A1* | 8/2013 | Roesner ............. G06F 21/6245 726/17 | |
| 2013/0223614 A1* | 8/2013 | Tuchman ............. G06F 3/0485 379/265.09 | |
| 2014/0101563 A1 | 4/2014 | Lilleness et al. | |
| 2014/0167931 A1 | 6/2014 | Lee et al. | |
| 2014/0188484 A1 | 7/2014 | Huang et al. | |
| 2014/0245142 A1 | 8/2014 | Dresti et al. | |
| 2015/0087278 A1 | 3/2015 | Kim et al. | |
| 2015/0154976 A1 | 6/2015 | Mutagi | |
| 2015/0213355 A1 | 7/2015 | Sharma et al. | |
| 2015/0278678 A1 | 10/2015 | Sharma et al. | |
| 2015/0278679 A1 | 10/2015 | Sharma et al. | |
| 2016/0127145 A1* | 5/2016 | Fu ....................... H04L 12/2816 700/275 | |
| 2016/0225369 A1* | 8/2016 | Agrawal ............. G06F 3/04886 | |
| 2016/0269904 A1* | 9/2016 | Sharma ................. G06N 3/006 | |
| 2017/0024378 A1 | 1/2017 | Sharma et al. | |
| 2017/0031711 A1* | 2/2017 | Wu ....................... G06F 9/453 | |
| 2017/0092117 A1 | 3/2017 | Huang et al. | |
| 2017/0186079 A1 | 6/2017 | Kim et al. | |
| 2017/0236512 A1 | 8/2017 | Williams et al. | |
| 2017/0243576 A1 | 8/2017 | Millington et al. | |
| 2017/0250835 A1 | 8/2017 | Kim et al. | |
| 2017/0345420 A1* | 11/2017 | Barnett, Jr. ............. G06F 3/167 | |
| 2018/0226074 A1 | 8/2018 | Millington et al. | |
| 2018/0240331 A1 | 8/2018 | Lee et al. | |
| 2018/0261079 A1 | 9/2018 | Huang et al. | |
| 2018/0307682 A1 | 10/2018 | Sharma et al. | |
| 2018/0316516 A1 | 11/2018 | Fu et al. | |
| 2018/0321996 A1* | 11/2018 | Riva ....................... G06F 9/547 | |
| 2019/0260707 A1* | 8/2019 | Kesavan ............. H04L 61/1535 | |
| 2020/0026586 A1* | 1/2020 | Das ....................... G06F 9/5077 | |

OTHER PUBLICATIONS

International Search Report and Written Opinion dated Jan. 3, 2019; International Appln. No. PCT/KR2018/010260.

\* cited by examiner

ELECTRONIC DEVICE, SERVER AND RECORDING MEDIUM SUPPORTING TASK EXECUTION USING EXTERNAL DEVICE

CROSS-REFERENCE TO RELATED APPLICATION(S)

This application is based on and claims priority under 35 U.S.C. § 119(a) of a Korean patent application number 10-2017-0114569, filed on Sep. 7, 2017, in the Korean Intellectual Property Office, the disclosure of which is incorporated by reference herein its entirety.

BACKGROUND

1. Field

The disclosure relates to an electronic device, a server, and a recording medium that support task execution using an external device.

2. Description of Related Art

For the purpose of aiming interaction with a user, recent electronic devices have proposed various types of input methods. For example, an electronic device may operate a voice input method that receives voice data according to user's utterance, based on the execution of a specific application. Furthermore, the electronic device may recognize the received voice data to derive the intent of a user utterance and may support a speech recognition service performing an operation corresponding to the derived intent of the user utterance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device, a server, and a recording medium that support task execution associated with the control of at least one Internet of things (IoT) device by using a specified external device.

Various operating platforms have been established in response to the commercialization of speech recognition service. For example, the speech recognition service may incorporate an IoT environment to support the functional operation control of an IoT device corresponding to a user utterance. However, since the speech recognition service associated with IoT device control supports only the formal voice input (or voice command), the control range for the IoT device may be limited or may be restricted by uniform control.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a touch screen display, which is accommodated in the housing and at least part of which is exposed visually, a microphone, a wireless communication circuit, a processor operatively connected to the touch screen display, the microphone, and the wireless communication circuit, and a memory operatively connected to the processor.

In accordance with another aspect of the disclosure, the memory is configured to store a software program including a user interface supporting the control of at least one external device based on a user account.

In accordance with another aspect of the disclosure, the memory is further configured to store at least one instruction, when executed, that causes the processor to control the wireless communication circuit to receive a first user input for connecting the electronic device to a first external device, via the user interface, control the wireless communication circuit to transmit first information corresponding to the user account and second information corresponding to the first external device, to a second external device, control the wireless communication circuit to receive a second user input corresponding to a request for performing at least part of a task by using the first external device, via the touch screen display or the microphone, control the wireless communication circuit to transmit data corresponding to the second user input to the second external device, control the wireless communication circuit to receive a first response including a sequence of states of the task to be used when the at least part of the task is performed by the first external device, from the second external device, and after receiving the first response, control to perform, by the first external device, the at least part of the task depending on the sequence.

In accordance with another aspect of the disclosure, a server is provided. The server may include a wireless communication circuit, a memory configured to store states of a task, and a processor.

In accordance with another aspect of the disclosure, the processor is configured control the wireless communication circuit to receive first data including first information corresponding to a first user account and second information corresponding to a first external device associated with the first user account, from a second external device, control the wireless communication circuit to receive second data corresponding to a request that allows the first external device to perform at least part of the task, from the second external device, in response to receiving the second data, determine a sequence associated with at least part of the states based at least partly on the first data, and control the wireless communication circuit to transmit a first response including the sequence to the second external device.

In accordance with another aspect of the disclosure, a non-transitory computer-readable storage medium is provided. The non-transitory computer-readable storage medium stores at least one instruction that gets executed by at least one processor.

In accordance with another aspect of the disclosure, the at least one instruction, when executed by the at least one processor, causes the at least one processor to control to receive first data including first information corresponding to a first user account and second information corresponding to a first external device associated with the first user account, from a second external device, control to receive second data corresponding to a request that allows the first external device to perform at least part of a task, from the second external device, in response to receiving the second data, determine a sequence associated with at least part of states of a previously stored task based at least partly on the first data, and control to transmit a first response including the determined sequence to the second external device.

According to another aspect of the disclosure, a voice input-based interface capable of controlling at least one IoT device may be provided.

Meanwhile, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
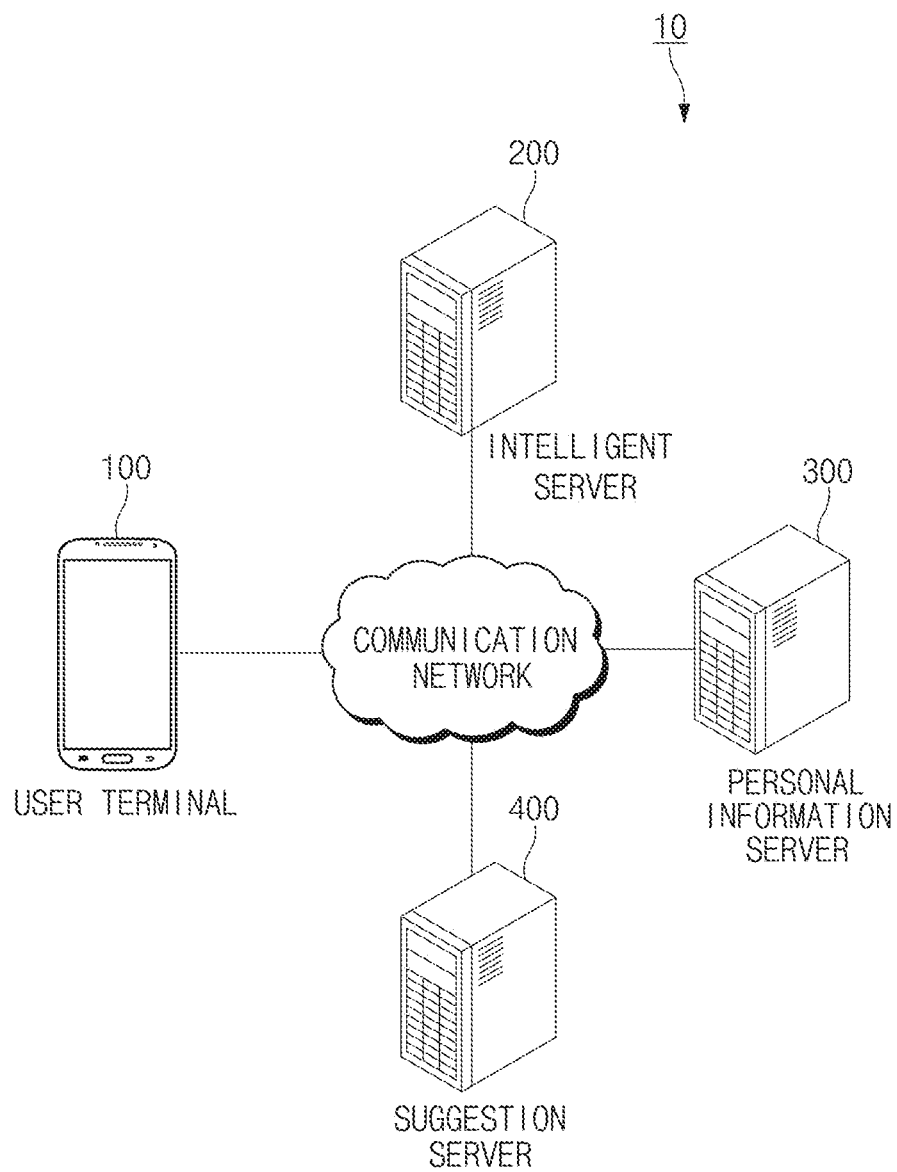
FIG. 1A is a block diagram illustrating an integrated intelligent system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expressions "have," "may have," "include," and "comprise," or "may include" and "may comprise" used herein indicate existence of corresponding features (e.g., components such as numeric values, functions, operations, or parts) but do not exclude presence of additional features.

In the disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Prior to describing various embodiments of the disclosure, an integrated intelligent system to which various embodiments of the disclosure are capable of being applied will be described with reference to FIGS. 1A through 1E.

FIG. 1A is a view illustrating an integrated intelligent system, according to an embodiment of the disclosure.

Referring to FIG. 1A, an integrated intelligent system 10 may include a user terminal 100, an intelligent server 200, a personal information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligent app (or a speech recognition app) stored in the user terminal 100. The other app may be executed through the intelligent app of the user terminal 100 and a user input for performing a task may be received. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app by using the command.

The intelligent server 200 may receive a voice input of a user from the user terminal 100 over a communication network and may convert the voice input to text data. In another embodiment, the intelligent server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the disclosure may indicate, but is not limited to, a sequence of states in which an electronic device performs the task requested by the user. In other words, the path rule may include information about the sequence of the states. For example, the task may be a certain action that the intelligent app is capable of providing. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a status of the user terminal 100, which executes the action, in a display. According to another embodiment, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. According to another embodiment, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligent server 200 may receive the user information from the personal information server 300 over the communication network and may generate a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 1B:
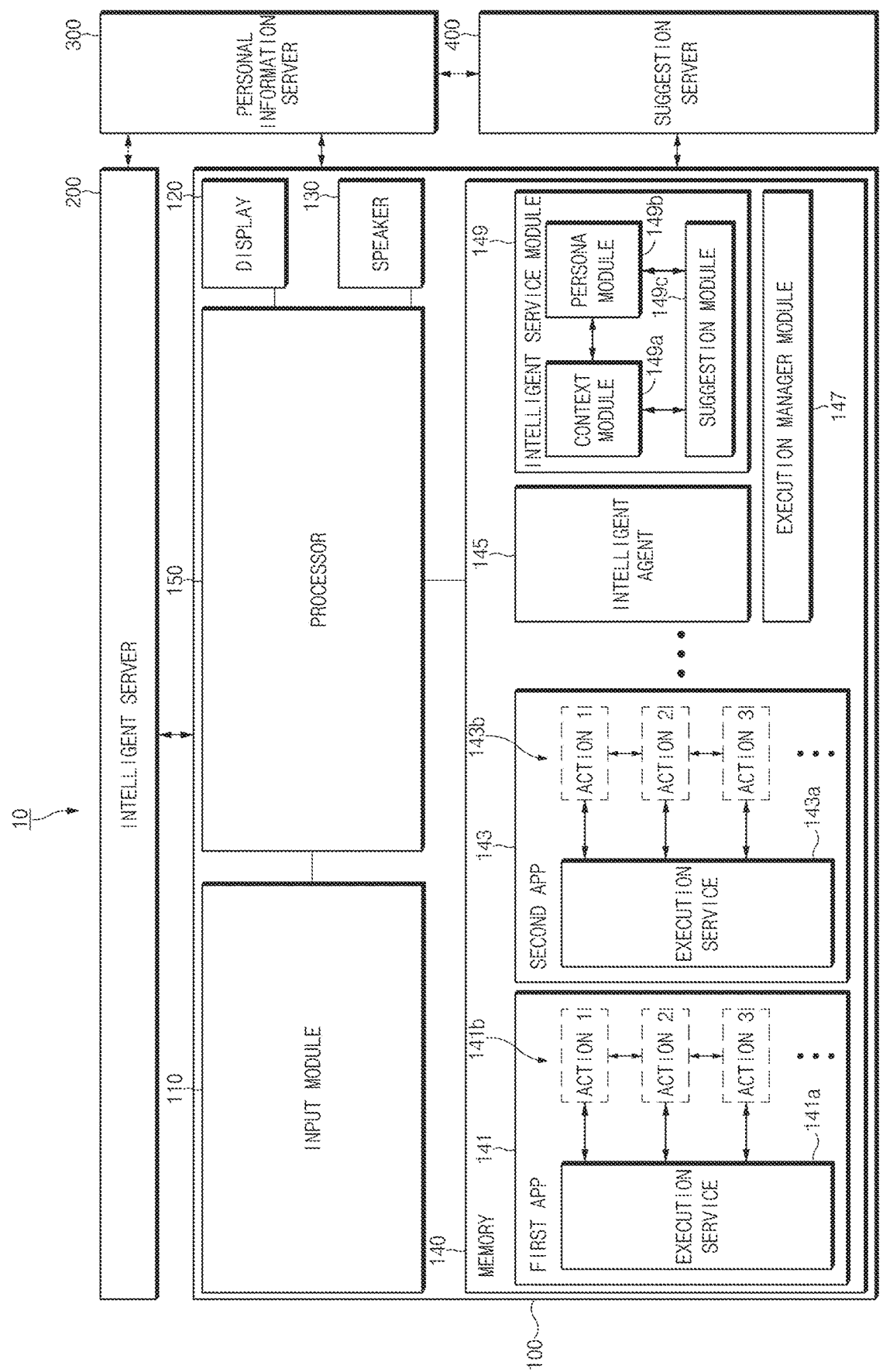
FIG. 1B is a block diagram illustrating a user terminal of an integrated intelligent system, according to an embodiment of the disclosure.

FIG. 1B is a block diagram illustrating a user terminal of an integrated intelligent system, according to an embodiment of the disclosure.

Referring to FIG. 1B, the user terminal 100 may include an input module 110, a display 120, a speaker 130, a memory 140, or a processor 150. At least part of components of the user terminal 100 may be electrically or operatively connected to the processor 150. The user terminal 100 may further include housing, and components of the user terminal 100 may be seated in the housing or may be positioned on the housing. The user terminal 100 may further include a communication circuit positioned in the housing. The user terminal 100 may transmit or receive data (or information) to or from an external server (e.g., the intelligent server 200) through the communication circuit. In various embodiments, the user terminal 100 may be referred to as an "electronic device" and may further include components of an electronic device 601 to be described through FIG. 6.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone that is capable of receiving the utterance of the user as a voice signal. For example, the input module 110 may include a speech input system and may receive the utterance of the user as a sound signal through the speech input system. For example, the microphone may be exposed through a part (e.g., a first portion) of the housing. In an embodiment, for the purpose of receiving a user input (e.g., a voice input) according to a user utterance, the microphone may be controlled to operate in an always-on state (e.g., always on) or may be controlled in the case where user manipulation is applied to a hardware key 112 of FIG. 1C. The user manipulation may include press manipulation to the hardware key 112, press and hold manipulation to the hardware key 112, or the like.

According to an embodiment, the display 120 may display an image, a video, and/or an execution screen of an application. For example, the display 120 may display a graphic user interface (GUI) of an app. In an embodiment, the display 120 may be exposed through a part (e.g., the second portion) of a housing to receive an input (e.g., touch input, drag input, or the like) by a user's body (e.g., a finger).

According to an embodiment, the speaker 130 may output the voice signal. For example, the speaker 130 may output the voice signal generated in the user terminal 100 to the outside. According to an embodiment, the speaker 130 may be exposed to a part (e.g., a third portion) of the housing.

According to an embodiment, the memory 140 may store a plurality of apps (or application programs) (e.g., a first app 141 and a second app 143). For example, the plurality of apps (e.g., the first app 141 and the second app 143) may be a program for performing a function corresponding to the user input. According to an embodiment, the memory 140 may store an intelligent agent 145, an execution manager module 147, or an intelligent service module 149. For example, the intelligent agent 145, the execution manager module 147 and the intelligent service module 149 may be a framework (or application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps (e.g., the first app 141 and the second app 143), and the plurality of apps may be loaded to operate. For example, the plurality of apps (e.g., the first app 141 and the second app 143) stored in the memory 140 may operate after being loaded by the execution manager module 147.

The plurality of apps (e.g., the first app 141 and the second app 143) may include execution service modules 141a and 143a performing a function. In an embodiment, the plurality of apps (e.g., the first app 141 and the second app 143) may perform a plurality of actions (e.g., a sequence of states) 141b and 143b through the execution service modules 141a and 143a for the purpose of performing a function. In other words, the execution service modules 141a and 143a may be activated by the execution manager module 147, and then may execute the plurality of actions 141b and 143b.

According to an embodiment, when the plurality of actions 141b and 143b of the first and second apps 141 and 143 are executed, an execution state screen according to the execution of the plurality of actions 141b and 143b may be displayed in the display 120. For example, the execution state screen may be a screen in a state where the plurality of actions 141b and 143b are completed. For another example, the execution state screen may be a screen in a state where the execution of the plurality of actions 141b and 143b is in partial landing (e.g., in the case where a parameter necessary for the plurality of actions 141b and 143b are not entered).

According to an embodiment, the execution service modules 141a and 143a may execute the plurality of actions 141b and 143b depending on a path rule. For example, the execution service modules 141a and 143a may be activated by the execution manager module 147, may receive an execution request from the execution manager module 147 depending on the path rule, and may execute functions of the first and second apps 141 and 143 by performing the plurality of actions and 143b depending on the execution request. When the execution of the plurality of actions 141b and 143b is completed, the execution service modules 141a and 143a may transmit completion information to the execution manager module 147.

According to an embodiment, in the case where the plurality of the plurality of actions and 143b are respectively executed in the first and second apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may transmit the execution request associated with the next action (e.g., action 2 of the first app 141 or action 2 of the second app 143) to the execution service modules 141a and 143a. According to an embodiment, in the case where the plurality of apps (e.g., the first app 141 and the second app 143) are executed, the plurality of apps may be sequentially executed. For example, when receiving the completion information after the execution of the last action (e.g., action 3 of the first app 141) of the first app 141 is completed, the execution manager module 147 may transmit the execution request of the first action (e.g., action 1 of the second app 143) of the second app 143 to the execution service module 143a.

According to an embodiment, in the case where the plurality of the actions 141b and 143b are executed in the first and second apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligent app (e.g., a speech recognition app) operating in conjunction with the intelligent agent 145. The app operating in conjunction with the intelligent agent 145 may receive and process the utterance of the user as a voice signal. According to an embodiment, the app operating in conjunction with the intelligent agent 145 may be operated by a specific input (e.g., an input through a hardware key, an input through a touchscreen, or a specific voice input) input through the input module 110.

According to an embodiment, the intelligent agent 145, the execution manager module 147, or the intelligent service module 149 stored in the memory 140 may be performed by the processor 150. The functions of the intelligent agent 145, the execution manager module 147, or the intelligent service module 149 may be implemented by the processor 150. It is described that the function of each of the intelligent agent 145, the execution manager module 147, and the intelligent service module 149 is the operation of the processor 150. According to an embodiment, the intelligent agent 145, the execution manager module 147, or the intelligent service module 149 stored in the memory 140 may be implemented with hardware as well as software.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store necessary information.

In an embodiment, the processor 150 may execute the intelligent agent 145, the execution manager module 147, or the intelligent service module 149 stored in the memory 140. As such, the processor 150 may implement the function of the intelligent agent 145, the execution manager module 147, or the intelligent service module 149.

According to an embodiment, the processor 150 may execute the intelligent agent 145 to generate an instruction for launching an app based on the voice signal received as the user input. According to an embodiment, the processor 150 may execute the execution manager module 147 to launch the first and second apps 141 and 143 stored in the memory 140 depending on the generated instruction. According to an embodiment, the processor 150 may execute the intelligent service module 149 to manage information of a user and may process a user input by using the information of the user.

The processor 150 may execute the intelligent agent 145 to transmit a user input received through the input module 110 to the intelligent server 200 and may process the user input through the intelligent server 200.

According to an embodiment, before transmitting the user input to the intelligent server 200, the processor 150 may execute the intelligent agent 145 to pre-process the user input. According to an embodiment, to pre-process the user input, the intelligent agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligent agent 145 may execute a wakeup recognition module stored in the memory 140 for the purpose of recognizing a call of a user. As such, the processor 150 may recognize the wakeup command of a user through the wakeup recognition module and may execute the intelligent agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligent agent 145. In the case where the intelligent agent 145 is executed, an intelligent app (e.g., a speech recognition app) operating in conjunction with the intelligent agent 145 may be executed.

According to an embodiment, the intelligent agent 145 may include a speech recognition module for performing the user input. The processor 150 may recognize the user input for executing an action in an app through the speech recognition module. For example, the processor 150 may recognize a limited user (voice) input (e.g., an utterance such as "click" for performing a capture operation when a camera app is being executed) for performing an action such as the wakeup command in the first and second apps 141 and 143 through the speech recognition module. For example, the processor 150 may assist the intelligent server 200 to recognize and rapidly process a user command capable of being processed in the user terminal 100 through the speech recognition module. According to an embodiment, the speech recognition module of the intelligent agent 145 for executing a user input may be implemented in an app processor.

According to an embodiment, the speech recognition module (including the speech recognition module of a wake up module) of the intelligent agent 145 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligent agent 145 to convert the voice input of the user into text data. For example, the processor 150 may transmit the voice of the user to the intelligent server 200 through the intelligent agent 145 and may receive the text data corresponding to the voice of the user from the intelligent server 200. As such, the processor 150 may display the converted text data in the display 120.

According to an embodiment, the processor 150 may execute the intelligent agent 145 to receive a path rule (or sequence) from the intelligent server 200. According to an embodiment, the processor 150 may transmit the path rule to the execution manager module 147 through the intelligent agent 145.

According to an embodiment, the processor 150 may execute the intelligent agent 145 to transmit the execution result log according to the path rule received from the intelligent server 200 to the intelligent service module 149, and the transmitted execution result log may be accumulated and managed in preference information of the user of a persona module 149*b*.

According to an embodiment, the processor 150 may execute the execution manager module 147, may receive the path rule from the intelligent agent 145, and may execute the first and second apps 141 and 143; and the processor 150 may allow the first and second apps 141 and 143 to execute the plurality of actions 141*b* and 143*b* included in the path rule. For example, the processor 150 may transmit command information (e.g., path rule information) for executing the plurality of actions 141*b* and 143*b* to the first and second apps 141 and 143, through the execution manager module 147; and the processor 150 may receive completion information of the plurality of actions 141*b* and 143*b* from the first and second apps 141 and 143.

According to an embodiment, the processor 150 may execute the execution manager module 147 to transmit the command information (e.g., path rule information) for executing the plurality of actions 141*b* and 143*b* of the first and second apps 141 and 143 between the intelligent agent 145 and the first and second apps 141 and 143. The processor 150 may bind the first and second apps 141 and 143 to be executed depending on the path rule through the execution manager module 147 and may transmit the command information (e.g., path rule information) of the plurality of actions 141*b* and 143*b* included in the path rule to the first and second apps 141 and 143. For example, the processor 150 may sequentially transmit the plurality of actions 141*b* and 143*b* included in the path rule to the first and second apps 141 and 143, through the execution manager module 147 and may sequentially execute the plurality of actions 141*b* and 143*b* of the first and second apps 141 and 143 depending on the path rule.

According to an embodiment, the processor 150 may execute the execution manager module 147 to manage execution states of the plurality of actions 141*b* and 143*b* of the first and second apps 141 and 143. For example, the processor 150 may receive information about the execution states of the plurality of actions 141*b* and 143*b* from the first and second apps 141 and 143, through the execution manager module 147. For example, in the case where the execution states of the plurality of actions 141*b* and 143*b* are in partial landing (e.g., in the case where a parameter necessary for the plurality of actions 141*b* and 143*b* are not input), the processor 150 may transmit information about the partial landing to the intelligent agent 145, through the execution manager module 147. The processor 150 may make a request for an input of necessary information (e.g., parameter information) to the user by using the received information through the intelligent agent 145. For another example, in the case where the execution state of each of the plurality of actions 141*b* and 143*b* is an operating state, the processor 150 may receive an utterance from the user through the intelligent agent 145. The processor 150 may transmit information about the first and second apps 141 and 143 being executed and the execution states of the first and second apps 141 and 143 to the intelligent agent 145, through the execution manager module 147. The processor 150 may transmit the user utterance to the intelligent server 200 through the intelligent agent 145. The processor 150 may receive parameter information of the utterance of the user from the intelligent server 200 through the intelligent agent 145. The processor 150 may transmit the received parameter information to the execution manager module 147 through the intelligent agent 145. The execution manager module 147 may change a parameter of each of the plurality of actions 141b and 143b to a new parameter by using the received parameter information.

According to an embodiment, the processor 150 may execute the execution manager module 147 to transmit parameter information included in the path rule to the first and second apps 141 and 143. In the case where the plurality of apps (e.g., the first app 141 and the second app 143) are sequentially executed depending on the path rule, the execution manager module 147 may transmit the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, in the case where the user utterance specifies one app (e.g., the first app 141) executing one action of the plurality of actions 141b but does not specify the other app (e.g., the second app 143) executing the other action of the plurality of actions 143b, the processor 150 may receive a plurality of different path rules, in which the same app (e.g., gallery app) executing the one action of the plurality of actions 141b is executed and in which a different app (e.g., message app or Telegram app) executing the other action of the plurality of actions 143b is executed, through the execution manager module 147. For example, the processor 150 may execute the same actions of the plurality of actions 141b and 143b (e.g., the same successive actions) of the plurality of path rules, through the execution manager module 147. In the case where the processor 150 executes the same action, the processor 150 may display a state screen for selecting the first and second apps 141 and 143 respectively included in the plurality of path rules in the display 120, through the execution manager module 147.

According to an embodiment, the intelligent service module 149 may include a context module 149a, the persona module 149b, or a suggestion module 149c.

The processor 150 may execute the context module 149a to collect current states of the first and second apps 141 and 143 from the first and second apps 141 and 143. For example, the processor 150 may execute the context module 149a to receive context information indicating the current states of the first and second apps 141 and 143 and may collect the current states of the first and second apps 141 and 143 through the received context information.

The processor 150 may execute the persona module 149b to manage personal information of the user utilizing the user terminal 100. For example, the processor 150 may execute the persona module 149b to collect usage information and the execution result of the user terminal 100 and may manage the personal information of the user by using the collected usage information and the collected execution result of the user terminal 100.

The processor 150 may execute the suggestion module 149c to predict the intent of the user and may recommend a command to the user based on the intent of the user. For example, the processor 150 may execute the suggestion module 149c to recommend a command to the user depending on the current state (e.g., a time, a place, a situation, or an app) of the user.

Figure 1C:
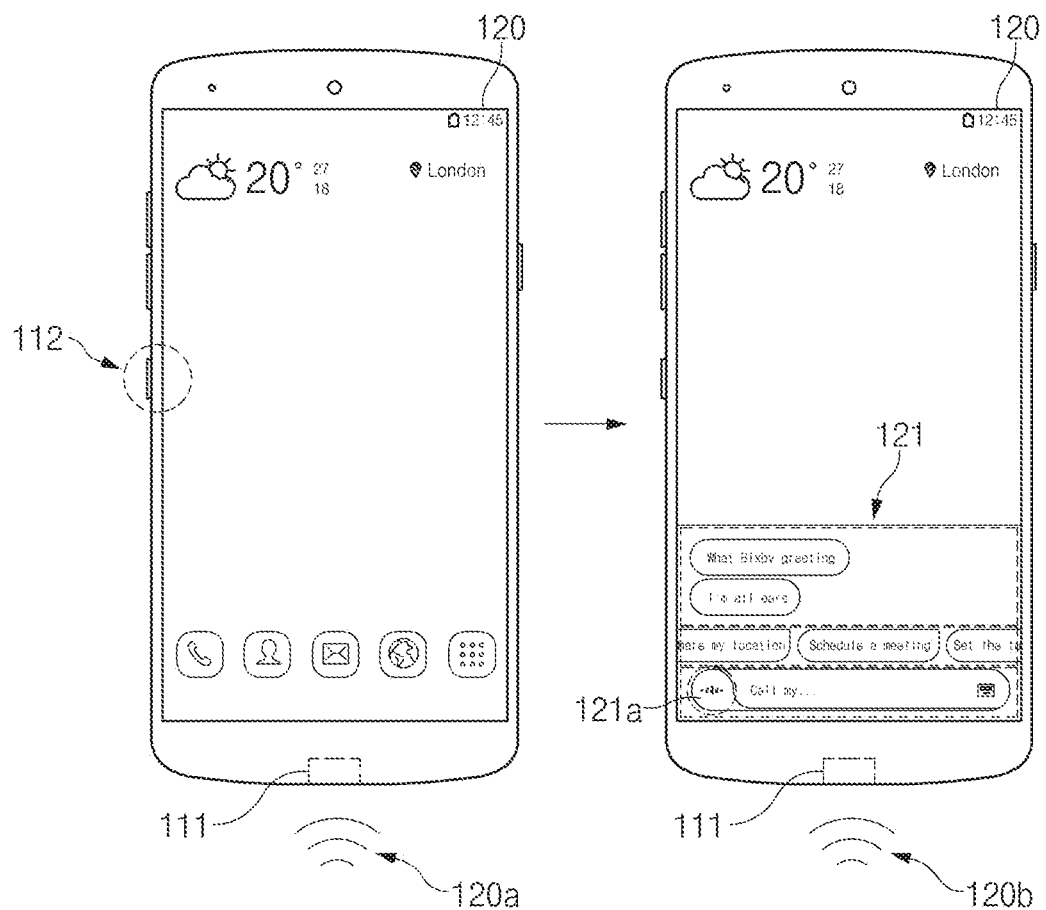
FIG. 1C is a view illustrating an execution form of an intelligent app, according to an embodiment of the disclosure.

FIG. 1C is a view illustrating an execution form of an intelligent app, according to an embodiment of the disclosure.

Referring to FIG. 1C, the user terminal 100 may receive a user input to launch an intelligent app (e.g., a speech recognition app) operating in conjunction with the intelligent agent 145 of FIG. 1B. For example, the user terminal 100 may launch an intelligent app for recognizing the voice based on a user input (e.g., press, press and hold, or the like) applied to the hardware key 112. After a user input applied to the hardware key 112 is generated, the intelligent agent 145 may be executed in a state capable of receiving a user utterance (or a voice input). In the case where the user terminal 100 receives the user input through the hardware key 112, the user terminal 100 may display a UI 121 of the intelligent app in the display 120. For example, a user may touch a speech recognition button 121a to the UI 121 of the intelligent app for the purpose of entering a voice in a state where the UI 121 of the intelligent app is displayed in the display 120. For another example, while continuously pressing the hardware key 112 to enter a voice 120b, the user may enter the voice 120b.

According to an embodiment, the user terminal 100 may execute the intelligent app for recognizing a voice through a microphone 111. For example, in the case where a specified voice (e.g., wake up!) is entered 120a through the microphone 111, the user terminal 100 may display the UI 121 of the intelligent app in the display 120.

Figure 1D:
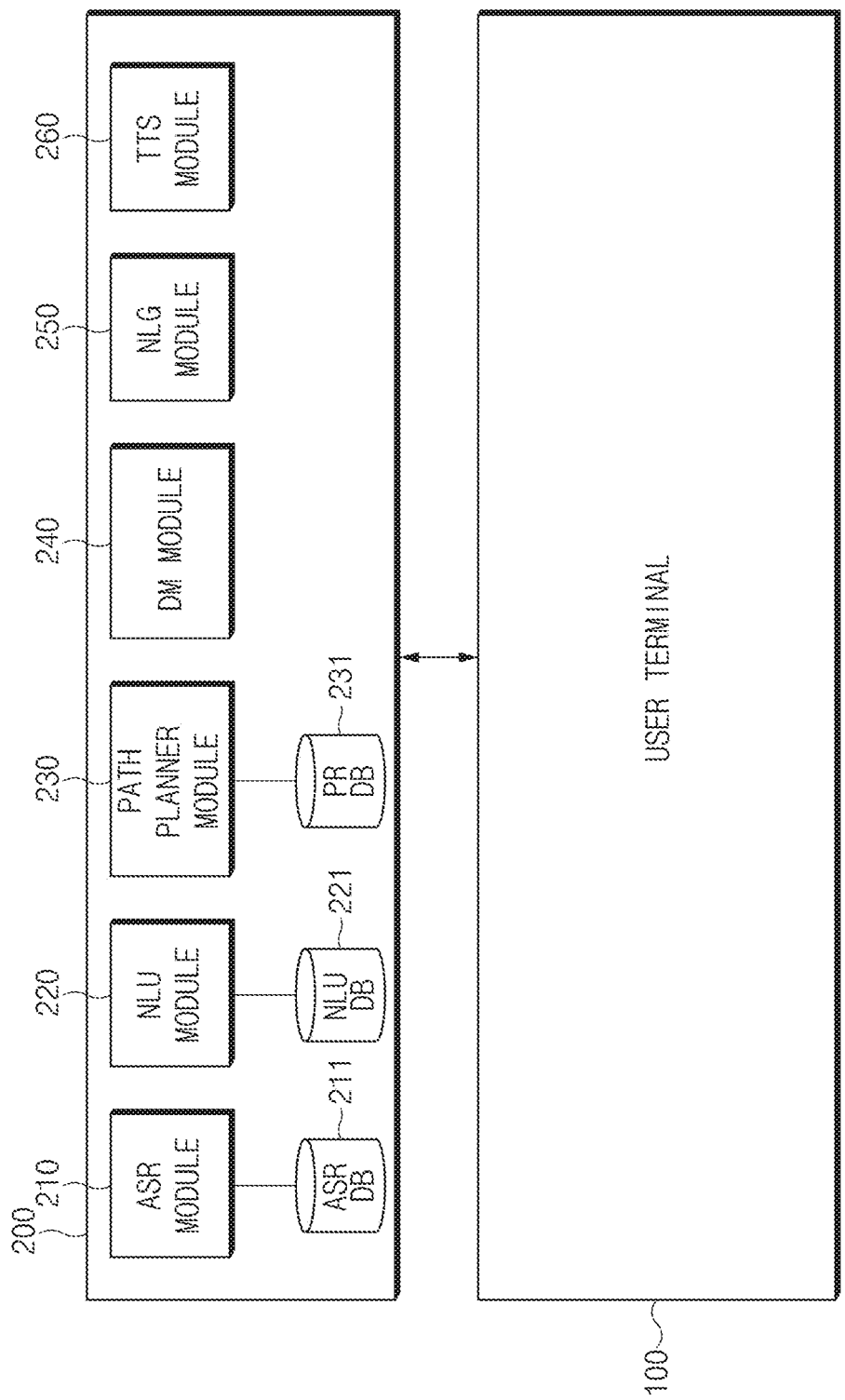
FIG. 1D is a diagram illustrating an intelligence server of an integrated intelligent system, according to an embodiment of the disclosure.

FIG. 1D is a block diagram illustrating an intelligent server of an integrated intelligent system, according to an embodiment of the disclosure.

Referring to FIG. 1D, the intelligent server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligent server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligent server 200 may transmit or receive data (or information) to or from an external electronic device (e.g., the user terminal 100) through the communication circuit. In various embodiments, the components of the intelligent server 200 may be implemented separately or at least part of the components may be implemented to be integrated.

The NLU module 220 or the path planner module 230 of the intelligent server 200 may generate a path rule.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in an NLU database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words which is based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligent agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 1E:
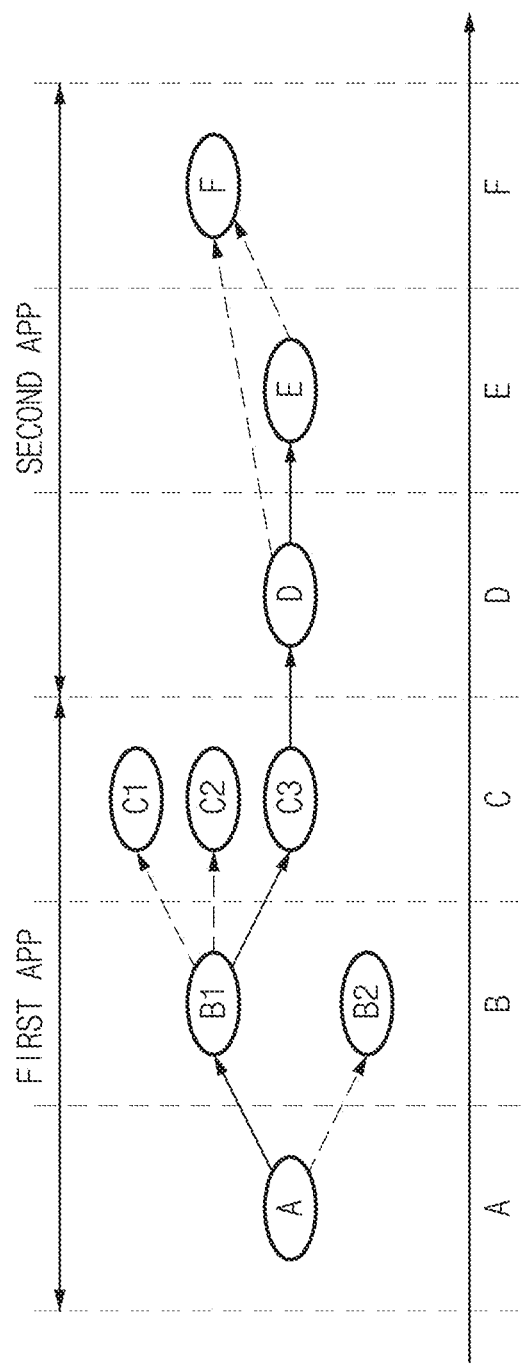
FIG. 1E is a view illustrating a path rule generating form of an intelligent server, according to an embodiment of the disclosure.

FIG. 1E is a view illustrating a path rule generating form of an intelligent server, according to an embodiment of the disclosure.

Referring to FIG. 1E, according to an embodiment, the NLU module 220 may divide the function of an app into any one action (e.g., state A to state F) and may store the divided unit actions in the PR DB 231. For example, the NLU module 220 may store a path rule set including a plurality of path rules (A-B1-C1, A-B1-C2, A-B1-C3-D-F, and A-B1-C3-D-E-F) divided into the one action (e.g., a state), in the PR DB 231.

According to an embodiment, the PR DB 231 of the path planner module 230 may store the path rule set for performing the function of an app. The path rule set may include a plurality of path rules each of which includes a plurality of actions (e.g., a sequence of states). An action executed depending on a parameter input to each of the plurality of actions included in each of the plurality of path rules may be sequentially arranged. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to an embodiment, the NLU module 220 may determine the intent of a user and the parameter corresponding to the user input (e.g., an input for selecting C3) additionally entered by the user terminal 100 for the purpose of transmitting the determined user intent or the determined parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the first and second apps 141 and 143 based on the selected one path rule.

According to an embodiment, in the case where a user input in which information is insufficient is received by the intelligent server 200, the NLU module 220 may generate a path rule partly corresponding to the received user input. For example, the NLU module 220 may transmit the partly corresponding path rule to the intelligent agent 145. The processor 150 may execute the intelligent agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligent agent 145 through the execution manager module 147 while executing the first app 141. The processor 150 may make a request for an additional input to a user by using the information about the insufficient parameter, through the intelligent agent 145. When an additional input is received by a user, the processor 150 may transmit and process a user input to the intelligent server 200 through the intelligent agent 145. The NLU module 220 may generate a path rule to be added, based on the intent of the user input additionally entered and parameter information and may transmit the path rule to be added, to the intelligent agent 145. The processor 150 may transmit the path rule to the execution manager module 147 through the intelligent agent 145 to execute the second app 143.

According to an embodiment, in the case where a user input, in which a portion of information is missed, is received by the intelligent server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missed, by using the user information. As such, even though the user input in which a portion of information is missed is received by the intelligent server 200, the NLU module 220 may make a request for the missed information to receive an additional input or may determine a path rule corresponding to the user input by using user information.

According to an embodiment, Table 1 attached below may indicate a form of a path rule associated with a task that a user requests.

TABLE 1

| Path rule ID | State | Parameter |
| --- | --- | --- |
| Gallery_R101 | PictureView S25 | NULL |
| | SearchView S26 | NULL |
| | SearchViewResult S27 | Location, time |
| | SearchEmptySelectedView S28 | NULL |
| | SearchSelectedView S29 | ContentType, selectall |
| | CrossShare S30 | Anaphora |

Referring to Table 1, a path rule that is generated or selected by an intelligent server (the intelligent server 200 of FIGS. 1A through 1E) depending on user speech (e.g., "please share a picture") may include at least one state S25, S26, S27, S28, S29 or S30. For example, the at least one state (e.g., one operating state of a terminal) may correspond to at least one of the picture application execution PicturesView S25, the picture search function execution SearchView S26, the search result display screen output SearchViewResult S27, the search result display screen output, in which a picture is non-selected, SearchEmptySelectedView S28, the search result display screen output, in which at least one picture is selected, SearchSelectedView S29, or the share application selection screen output CrossShare S30.

In an embodiment, parameter information of the path rule may correspond to at least one state. For example, the search result display screen output, in which at least one picture is selected, SearchSelectedView S29 may be included in the at least one state.

The task (e.g., "please share a picture!") that the user requests may be performed depending on the execution result of the path rule including the sequence of the states S25, S26, S27, S28, and S29.

According to various embodiments, at least part of components of the integrated intelligent system 10 of FIG. 1A may perform a series of processes for providing a speech recognition-based service. For example, the user terminal 100 of FIG. 1B may receive a user input (e.g., a voice input) according to user utterance to transmit the user input to the intelligent server 200 of FIG. 1D, and the intelligent server 200 may generate (or select) a path rule based on the user input. The user terminal 100 may receive a path rule from the intelligent server 200 to perform at least one operation constituting the path rule, and thus may perform a task (e.g., the control of the execution and function of an app) corresponding to a user utterance.

Figure 2A:
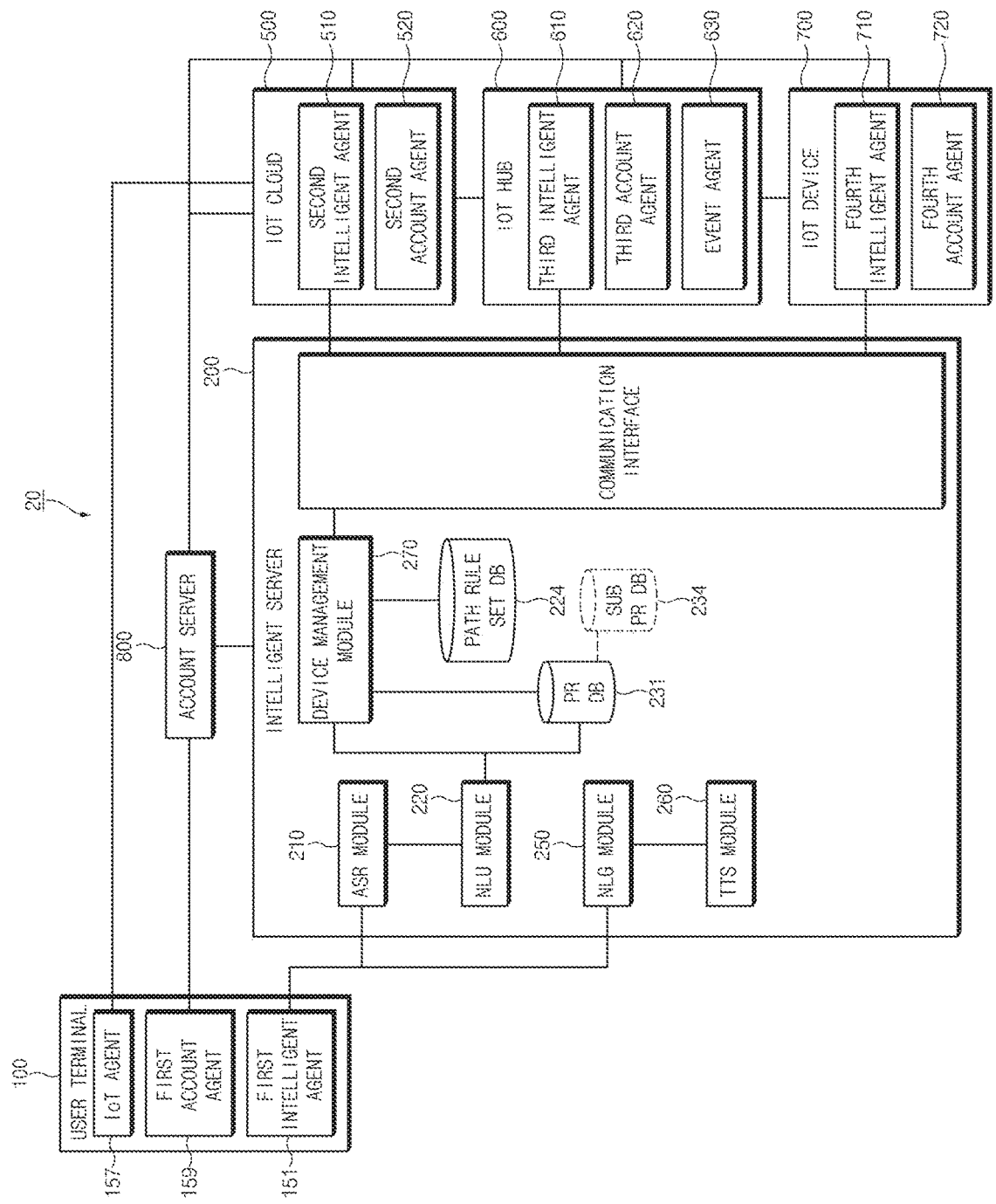
FIG. 2A is a view illustrating an Internet of things (IoT) system, according to an embodiment of the disclosure.

FIG. 2A is a view illustrating an Internet of things (IoT) system, according to an embodiment of the disclosure.

Figure 2B:
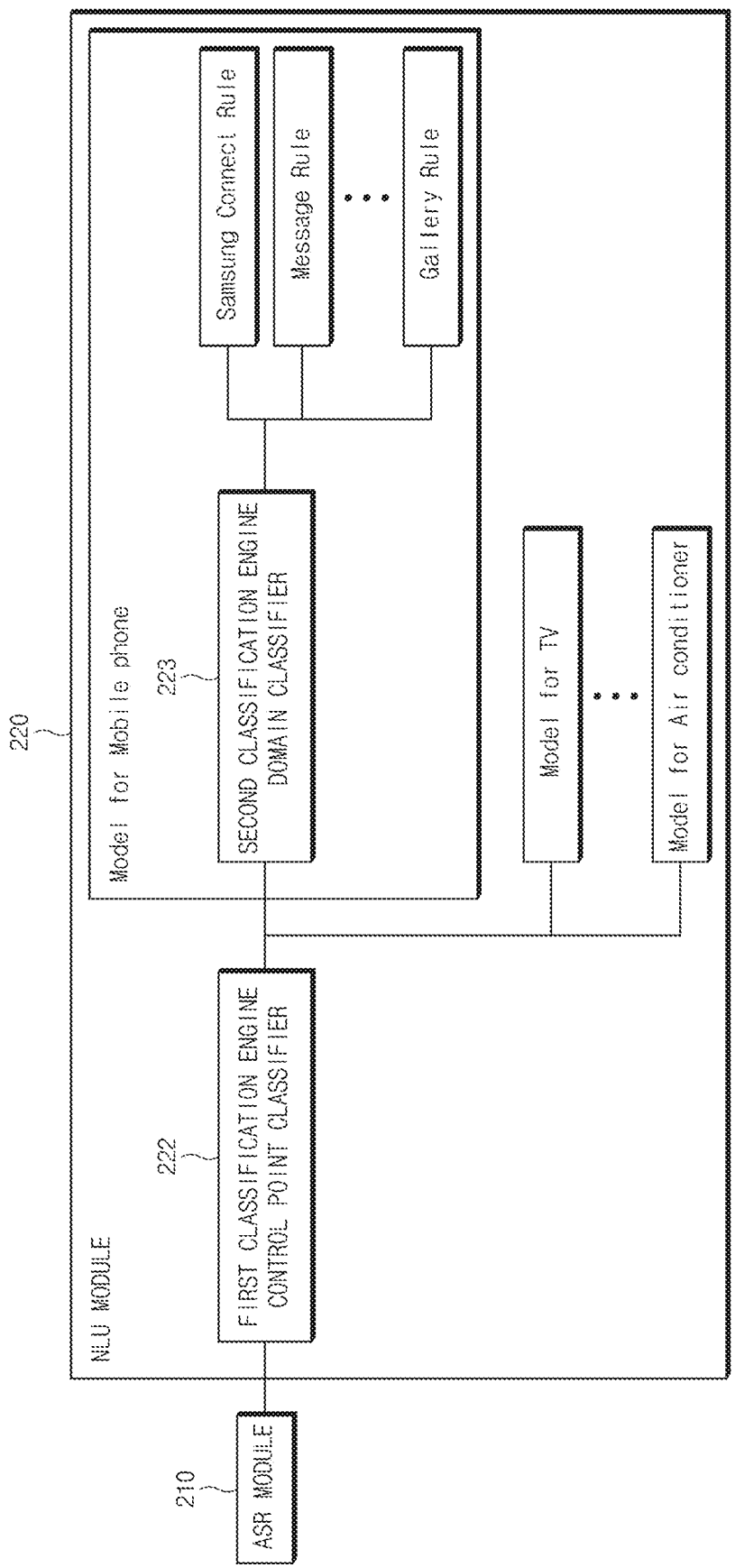
FIG. 2B is a view illustrating a natural language understanding (NLU) module of an IoT system, according to an embodiment of the disclosure.

FIG. 2B is a view illustrating an NLU module of an IoT system, according to an embodiment of the disclosure.

In FIGS. 2A and 2B, the same reference numerals may be assigned to a component the same as or corresponding to the component described with reference to FIGS. 1A to 1E and duplicated descriptions may be omitted.

Referring to FIG. 2A, a user input (or voice input) according to a user utterance may operate as an interface for controlling at least one IoT device. In this regard, at least some components of the above-described integrated intelligent system 10 of FIG. 1A may be integrated into an IoT environment to build an IoT system 20. For example, the user terminal 100 or the intelligent server 200 of the integrated intelligent system 10 may build the IoT system 20 by establishing an intelligent infrastructure (or intelligent network) in conjunction with at least one server (e.g., an IoT cloud 500, an IoT hub 600, an account server 800, or the like) or a device (e.g., an IoT device or the like), which constitutes the IoT environment.

In an embodiment, the user terminal 100 inside the IoT system 20 may further include a component associated with the control of at least one IoT device 700 in addition to the above-described component through FIG. 1B. For example, the user terminal 100 may further include at least one of an IoT agent 157 or a first account agent 159 in addition to a first intelligent agent 151 (e.g., the intelligent agent 145 of FIG. 1B). According to an embodiment, the first intelligent agent 151, the IoT agent 157, or the first account agent 159 may be executed by the processor 150 of FIG. 1B of the user terminal 100. In addition, the user terminal 100 may include a dedicated app (e.g., SAMSUNG connect app, or the like) (or may store the dedicated app in the memory 140 of FIG. 1B) for controlling the at least one IoT device 700. The user terminal 100 may control the at least one IoT device 700 by using the dedicated app executed based on user account information (e.g., SAMSUNG account information, GOOGLE account information, or the like) entered from a user.

According to an embodiment, the IoT agent 157 may transmit a control signal to the at least one IoT device 700 by using the communication circuit of the user terminal 100. Alternatively, the IoT agent 157 may transmit a signal associated with the control of the at least one IoT device 700 to the IoT cloud 500 and may control the at least one IoT device 700 based on the IoT cloud 500 operating based on the signal. The first account agent 159 according to an embodiment may manage user account information (e.g., SAMSUNG account information, GOOGLE account information, or the like) stored in the user terminal 100. Alternatively, the first account agent 159 may communicate with the account server 800 that collectively manages the user account information to perform a series of authentication processes based on the user account information, and the authentication processes will be described later.

According to an embodiment, similarly to the user terminal 100, the intelligent server 200 may further include a device management module 270 to control the at least one IoT device 700. The device management module 270 may generate the path rule of the at least one IoT device 700 to establish a path rule set DB 224 and/or the PR DB 231 and may manage at least one path rule stored in the path rule set DB 224 and/or the PR DB 231. In this regard, the device management module 270 may generate a path rule set associated with the functional operation control of the at least one IoT device 700, which has been registered or is to be registered in the IoT cloud 500, to store the path rule set in the path rule set DB 224. In this operation, the device management module 270 may obtain identification information (e.g., model information, version information, operating country information, operating system information, or the like) of the at least one IoT device 700 from the IoT cloud 500 and may use the obtained identification information to generate the path rule set. Alternatively, the device management module 270 may generate a path rule set associated with the functional operation control (e.g., the execution and control of an app) of the user terminal 100 to store the path rule set in the path rule set DB 224.

In an embodiment, the device management module 270 may determine the possibility of link between at least one or more path rules stored in the path rule set DB 224. Hereinafter, at least one path rule is referred to as a "first path rule." Alternatively, the device management module 270 may determine the possibility of link between the first path rule and at least one path rule (hereinafter referred to as a "second path rule") stored in the PR DB 231. In the case where it is determined that the link is possible, the device management module 270 may update a path rule for generating a third path rule, by combining the first path rules or combining the first path rule and the second path rule. In various embodiments, the device management module 270 may store the updated third path rule in the PR DB 231 and may provide the NLU module 220 with identification information of the at least one IoT device 700 associated with at least one path rule stored in the path rule set DB 224 and/or the PR DB 231.

According to an embodiment, the IoT cloud 500 may collectively manage the registered at least one IoT device 700. In this regard, the IoT cloud 500 may receive various types of operation information from the registered at least one IoT device 700 or the at least one IoT device 700 adjacent thereto in the form of real time, batch, stream, or the like and may build the received pieces of information in a database. Furthermore, the IoT cloud 500 may receive a control signal associated with the specific at least one IoT device 700 from the IoT agent 157 of the user terminal 100 and may control the driving or the functional operation of the at least one IoT device 700 related based on the control signal.

In an embodiment, the IoT hub 600 may manage the at least one IoT device 700, which is capable of communicating with the IoT cloud 500, from among the at least one IoT device 700 registered in the IoT cloud 500. In various embodiments, the IoT hub 600 may be excluded from the components of the IoT system 20; in this case, the above-described functional operation of the IoT hub 600 may be performed by the IoT cloud 500.

The at least one IoT device 700 according to an embodiment may include electronic appliances (e.g., air conditioners, refrigerators, washing machines, TV, ovens, or the like), security devices (e.g., door locks, CCTV, or the like), driving devices (e.g., vehicles, drones, or the like) or various types of sensors, which is serviced based on IoT technology. In an embodiment, the at least one IoT device 700 may be registered in the IoT cloud 500 through a series of registration processes that will be described later, and may transmit, to the IoT cloud 500, operation information such as identification information, attribute information, location information, motion information, state information, or the like.

In an embodiment, the IoT cloud 500, the IoT hub 600, or the at least one IoT device 700 may include at least one of an intelligent agent (e.g., a second intelligent agent 510, a third intelligent agent 610, or a fourth intelligent agent 710), which performs functions the same as or similar to those of the first intelligent agent 151 of the user terminal 100, and an account agent (e.g., a second account agent 520, a third account agent 620, or a fourth account agent 720) corresponding to the first account agent 159 of the user terminal 100. Alternatively, the IoT hub 600 may further include an event agent 630 for storing and managing an application programming interface (API) (e.g., API including languages or functions associated with the execution of a specific function) to be transmitted to the at least one IoT device 700. In various embodiments, the IoT cloud 500, the IoT hub 600, the at least one IoT device 700, or the account server 800 may include an independent operating system and may include a processor that generally controls a functional operation, a memory electrically or operatively connected to the processor, or a communication interface (or a communication circuit or a communication module) supporting communication.

Referring to FIGS. 2A and 2B, the NLU module 220 may include a first classification engine 222 that classifies a user input of the form of text data, which is received from the ASR module 210, depending on specified criteria. In an embodiment, the first classification engine 222 may determine whether the user input is associated with the at least one IoT device 700, and may transmit the user input to a relevant NLU model depending on the determination result. For example, in the case where a word, a phrase, a morpheme, a context, or the like associated with the at least one IoT device 700 is not included in the text data received from the ASR module 210, the first classification engine 222 may determine that the user input is associated with the functional operation control (e.g., the execution and control of an app) of the user terminal 100, and may transmit the user input to an NLU model assigned to the user terminal 100. As such, in the case where a word, a phrase, a morpheme, a context, or the like associated with the at least one IoT device 700 is included in the text data, the first classification engine 222 may determine that the user input is associated with the control of the at least one IoT device 700. At this time, the first classification engine 222 may identify the type of the at least one IoT device 700 (e.g., TV, air conditioner, or the like) associated based on the word, the phrase, the morpheme, the context, or the like and may transmit the user input to an NLU model corresponding to the identified type of the at least one IoT device 700.

In an embodiment, the user input transmitted by the first classification engine 222 to the corresponding NLU model may be used by a second classification engine 223 included in the corresponding NLU model to generate or select a path rule according to a specific domain. For example, the second classification engine 223 in the NLU model allocated to the user terminal 100 may identify a domain with respect to the transmitted user input and may generate or select a path rule by applying the user input to a path rule set associated with an app (e.g., a message app, a gallery app, or the like) corresponding to the identified domain. Similarly, the second classification engine in the NLU model allocated to the specific type of the at least one IoT device 700 may apply the user input to a path rule set of the at least one IoT device 700 associated with the identified domain, by identifying a domain with respect to the transmitted user input. In various embodiments, with regard to the generation of the NLU model, the NLU module 220 may refer to a path rule of the at least one IoT device 700 or a path rule of the user terminal 100, which is stored in the path rule set DB 224 or the PR DB 231. Alternatively, the NLU module 220 may generate the NLU model with reference to identification information (e.g., model information, version information, operating country information, operating system information, or the like) about the at least one IoT device 700 provided from the device management module 270.

In an embodiment, as described above, the IoT agent 157 of the user terminal 100 may control the at least one IoT device 700. In this regard, the path rule generated (or selected) with regard to the functional operation control of the at least one IoT device 700 may be merged in a path rule (e.g., a path rule associated with the execution of the specific app or a path rule associated with the output of an interface according to the execution of the specific app) associated with a specific app (e.g., SAMSUNG connect app, or the like) operating in conjunction with the IoT agent 157. The IoT agent 157 may control the functional operation of the at least one IoT device 700 through the execution of the specific app, based on the merged path rule. Alternatively, in the case where the IoT agent 157 controls the at least one IoT device 700 through the IoT cloud 500, the path rule generated (or selected) from an NLU model allocated to each of the at least one IoT device 700 may be composed of at least one or more operations accompanied with a signal associated with the control of the at least one IoT device 700. The IoT agent 157 transmits the signal to the IoT cloud 500.

According to an embodiment, the IoT system 20 may process a user input according to a user utterance and may support the control of the driving or the functional operation of the at least one IoT device 700, based on the function execution of components (e.g., the user terminal 100, the intelligent server 200, the IoT cloud 500, the IoT hub 600, or the account server 800). At this time, the components of the IoT system 20 may perform a series of registration processes for registering the new (or unregistered) at least one IoT device 700 in the user terminal 100 or the IoT cloud 500. Alternatively, at least part of components of the IoT system 20 may perform path rule update for combining a path rule associated with the newly registered at least one IoT device 700 with another path rule (e.g., a path rule associated with another at least one IoT device 700 or a path rule associated with the control of an app included in the user terminal 100). Hereinafter, various embodiments of the control of the at least one IoT device 700 based on the execution of a path rule and various operation examples of the user terminal 100 associated with the control will be described with reference to accompanying drawings.

Figure 3:
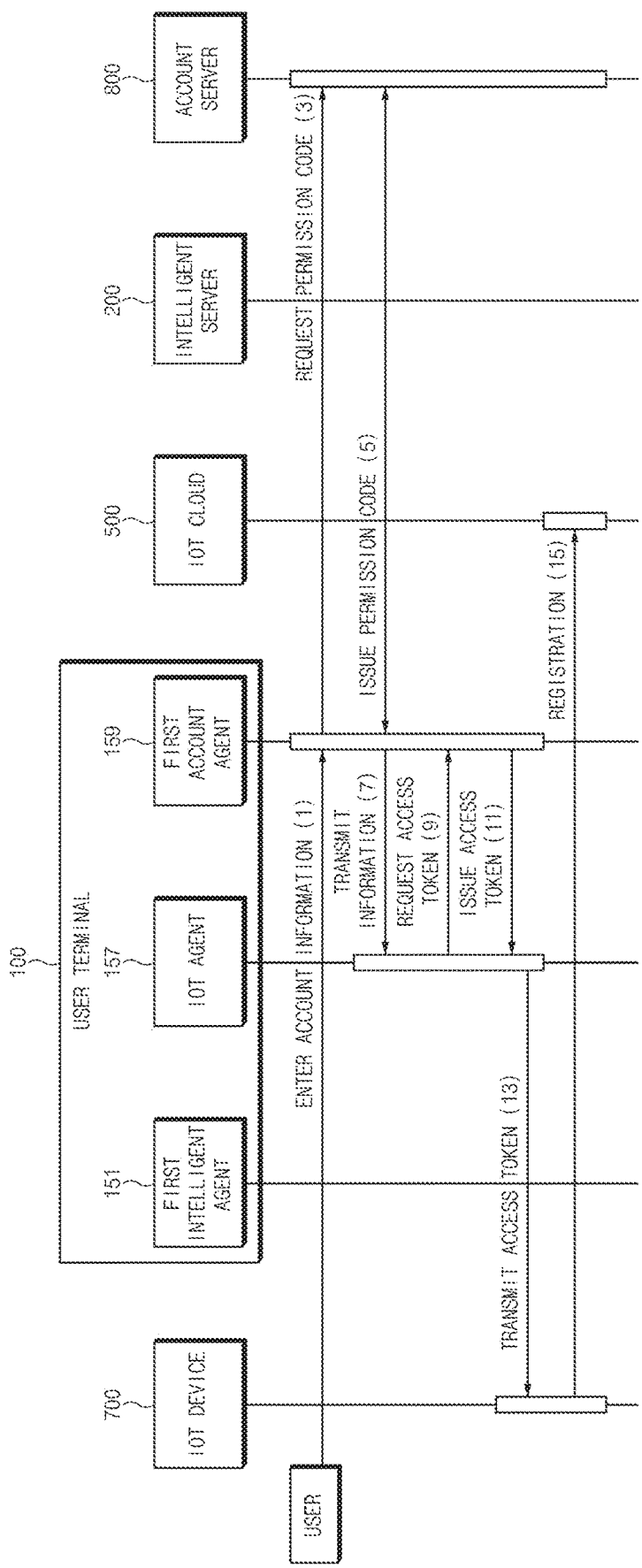
FIG. 3 is a diagram illustrating an authentication process performed between at least part of components of an IoT system, according to an embodiment of the disclosure.

FIG. 3 is a diagram illustrating an authentication process performed between at least part of components of an IoT system, according to an embodiment of the disclosure.

In an embodiment, the communication between at least some components of the IoT system 20 of FIG. 2A may be based on whether the granted access permission is present, and the access permission may be determined based on whether specified information is retained or whether the specified information is presented.

Referring to FIG. 3, in operation 1, user account information (e.g., SAMSUNG account and password information, or GOOGLE account and password information, or the like) may be entered into a specified graphic user interface (GUI) (e.g., an execution screen of dedicated app (e.g., SAMSUNG connect app, or the like) for accessing the IoT system 20) output by the user terminal 100, in response to a user utterance or a user input (e.g., touch input). Accordingly, the first account agent 159 of the user terminal 100 may obtain the account information entered into the GUI.

In operation 3, the first account agent 159 may transmit the obtained user account information to the account server 800 and may make a request for an authentication of the user account information and a specified permission code based on the authentication. In an embodiment, the account server 800 may determine (or authenticate) the validity of the user account information received from the first account agent 159. For example, the account server 800 may determine the validity with reference to the issuance history, true or false, an expiration date, or the like of the user account information. When it is determined that the user account information is valid (or authenticated), in operation 5, the account server 800 may issue a specified permission code, information (e.g., permission type, permission range, or the like) of the permission code, and a specified access token to the first account agent 159.

In operation 7, the first account agent 159 may transmit a part of the permission code, the permission code information, and the access token from the account server 800, to the IoT agent 157. For example, the first account agent 159 may transmit the permission code and the permission code information to the IoT agent 157.

In operation 9 and operation 11, the IoT agent 157 may make a request for an access token to the first account agent 159 based on the received permission code and then may receive the access token. In this regard, the first account agent 159 may determine whether the permission code, which has been transmitted to the IoT agent 157, coincides with the permission code, which the IoT agent 157 keeps (or the IoT agent 157 presents) upon requesting the access token. In the case where the permission codes coincide with each other, the first account agent 159 may determine that the access token request of the IoT agent 157 is valid, and may issue the access token received from the account server 800 to the IoT agent 157.

In operation 13, the IoT agent 157 may transmit the access token from the first account agent 159 to the specific at least one IoT device 700, based on wired communication or wireless communication. In an embodiment, it is understood that the specific at least one IoT device 700 is a device that is not registered in the IoT cloud 500 (or the user terminal 100); in this regard, in operation 15, the specific at least one IoT device 700 may make a request for the registration to the IoT cloud 500 (or the user terminal 100) based on the access token received from the IoT agent 157. In the case where the specific at least one IoT device 700 is registered in the IoT cloud 500 (or the user terminal 100), the communication between the IoT cloud 500 (or the user terminal 100) and the specific at least one IoT device 700 may be established.

As described above, the communication between at least part of components of the IoT system 20 and another component may be granted or denied depending on whether the access token is retained or whether the access token is present, and thus the security policy in the IoT system 20 may be established.

Figure 4A:
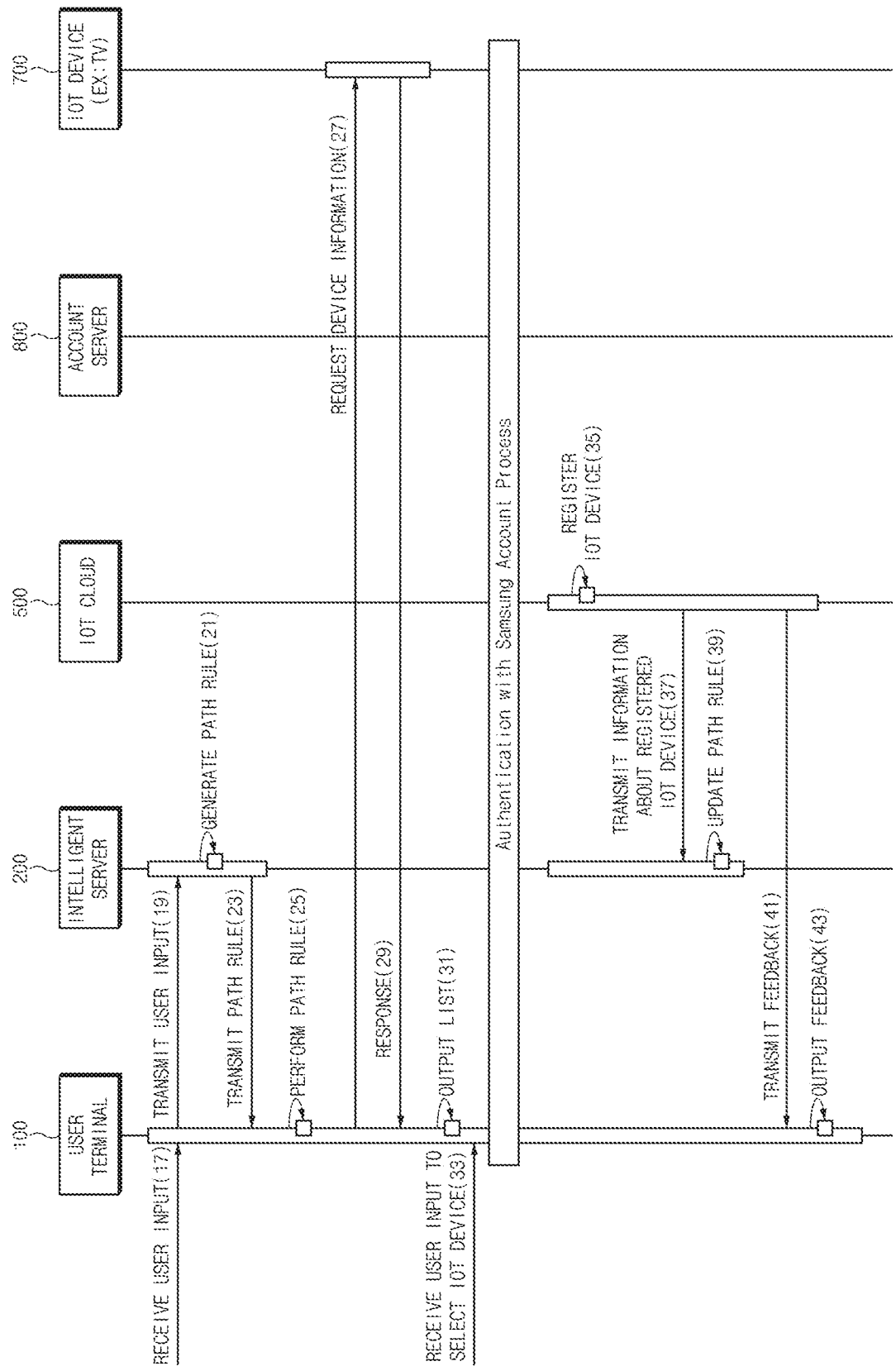
FIG. 4A is a diagram illustrating a first registration process of an IoT device, according to an embodiment of the disclosure.
Figure 4B:
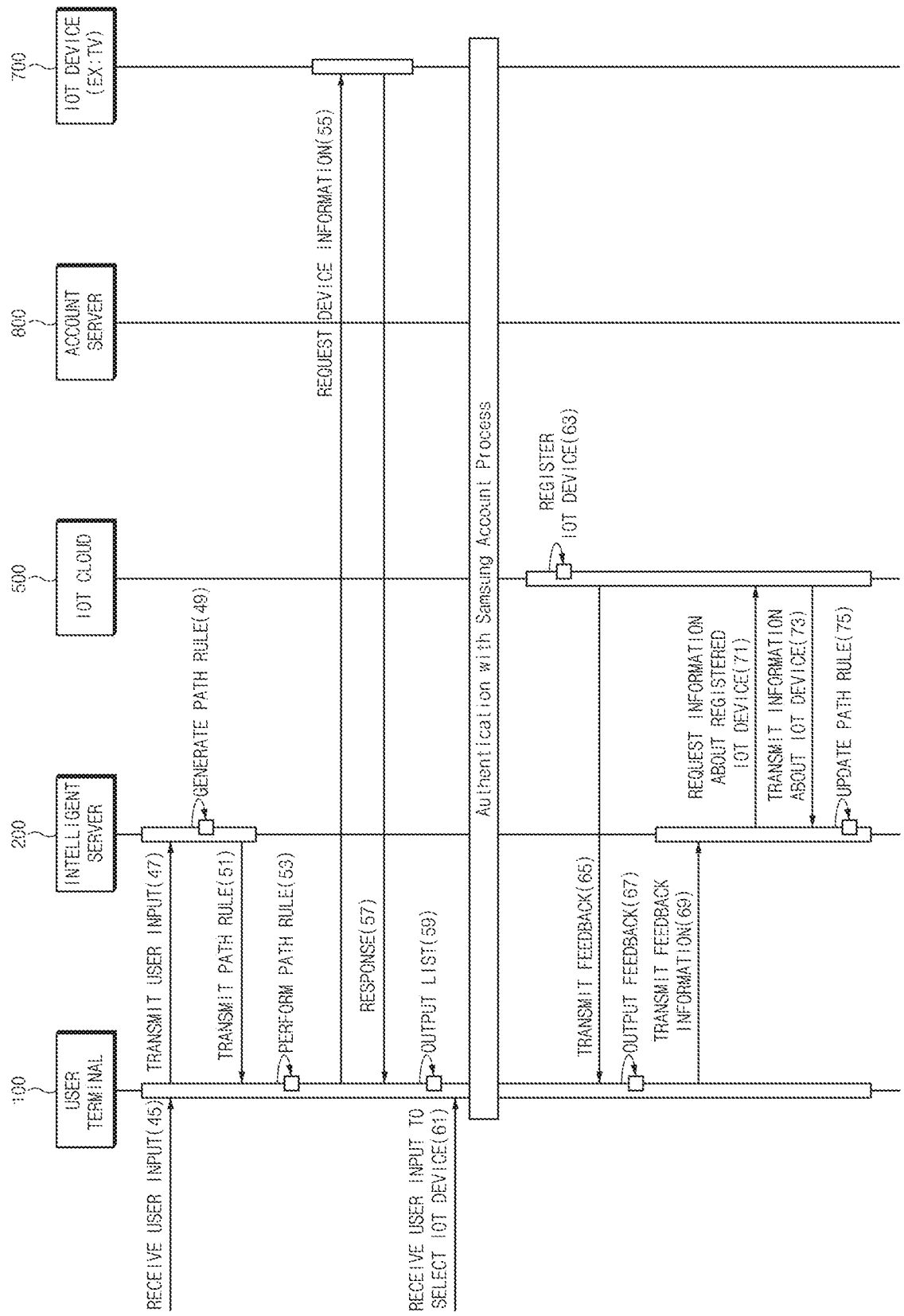
FIG. 4B is a diagram illustrating a second registration process of an IoT device, according to an embodiment of the disclosure.

FIGS. 4A and 4B are diagrams illustrating various registration processes of an IoT device, according to an embodiment of the disclosure.

In an embodiment, the user terminal 100 may transmit a user input (e.g., voice input) according to a user utterance, to the intelligent server 200 and may process the registration of the specific at least one IoT device 700 based on the execution of a path rule from the intelligent server 200.

Referring to FIG. 4A, in operation 17 and operation 19, the user terminal 100 may receive a user input according to a user utterance (e.g., please register TV with a SAMSUNG account) including a specific command or intent, through a user's manipulation of a specified hardware key (the hardware key 112 of FIG. 1C) or an intelligent app to be executed depending on a specified wakeup command utterance and may transmit the user input to the intelligent server 200.

In operation 21, the intelligent server 200 may generate a path rule corresponding to the user utterance, based on the user input received from the user terminal 100. For example, the ASR module 210 of FIG. 2A of the intelligent server 200 may change a user input of a voice data format into text data, and the NLU module 220 of FIG. 2A may generate a path rule corresponding to the intent of the user utterance by deriving the intent of the user utterance based on the text data. In an embodiment, in the case where the intent of the user utterance is derived as being associated with the registration of the specific at least one IoT device 700 (e.g., TV), the NLU module 220 may generate a path rule for registering the specific at least one IoT device 700 based on the execution of a specific app (e.g., SAMSUNG connect app, or the like) mounted in the user terminal 100 and, in operation 23, may transmit the generated path rule to the user terminal 100.

In various embodiments associated with operations 17, 19, 21, and 23, the user utterance (e.g., please turn on TV) may not include a word, a phrase, a morpheme, a context, or the like associated with the registration of a specific IoT device (e.g., TV). In this case, the NLU module 220 may generate a path rule associated with the registration of an IoT device (e.g., TV), with reference to domain information identified in an operation of deriving the intent of a user utterance. For example, when the identified domain is associated with the at least one IoT device 700 (e.g., the name of an IoT device), the NLU module 220 may determine whether the at least one IoT device 700 is registered in the user terminal 100 or the IoT cloud 500. In the case where it is determined that the at least one IoT device 700 associated with the domain is an unregistered device, the NLU module 220 may generate a path rule for registering the at least one IoT device 700 based on the execution of the specific app (e.g., SAMSUNG connect app, or the like) to transmit the path rule to the user terminal 100, before generating a path rule corresponding to a user utterance (e.g., please turn on TV).

In operation 25, the first intelligent agent 151 of FIG. 2A of the user terminal 100 may receive the path rule from the intelligent server 200 to transmit the path rule to an execution manager module (e.g., the execution manager module 147 of FIG. 1B). The execution manager module 147 may identify an app (e.g., SAMSUNG connect app, or the like) associated with the path rule, and may transmit a first operation (e.g., the execution operation of the SAMSUNG connect app) of at least one operation constituting the path rule, to an execution service module in the identified app. According to various embodiments, it is understood that the at least one operation constituting the path rule is at least one state of the user terminal 100 for performing a task (e.g., the registration of an IoT device (TV)) according to the path rule.

In an embodiment, after performing the received first operation, the execution service module may transmit the execution completion information to the execution manager module 147 and may receive a second operation (e.g., an operation of searching for a nearby IoT device) arranged in order after the first operation on a path rule, from the execution manager module 147.

With regard to the execution of the second operation of the execution service module, in operation 27 and operation 29, the user terminal 100 may make a request for operation information such as identification information, attribute information, location information, motion information, state information, or the like of the corresponding device to the at least one IoT device 700, which is present within a specified area range (or distance range) with respect to the user terminal 100 to receive a response. Alternatively, the at least one IoT device 700 that is present within a specified area range from the user terminal 100 may transmit the operation information to the user terminal 100 in real time or depending on a specified period, regardless of the request of the user terminal 100.

In operation 31, based on the screen interface of an app (e.g., SAMSUNG connect app) executed depending on the execution of the path rule, the user terminal 100 may output the at least one IoT device 700 providing the operation information in the form of a list and, in operation 33, may receive a user input (e.g., a voice input or a touch input) to select the specific at least one IoT device 700 on the list. In this operation, the specific at least one IoT device 700 selected by the user input may be mapped to account information (e.g., SAMSUNG account, GOOGLE account, or the like) accompanied by the app (e.g., SAMSUNG connect).

According to an embodiment, after operation 33 is completed, a part of components of an IoT system (the IoT system 20 of FIG. 2A) may perform the authentication process based on the account server 800 described with reference to FIG. 3, and then, as illustrated in operation 35, the at least one IoT device 700 selected from a user may be registered in (or connected to) the IoT cloud 500 (or the user terminal 100).

In operation 37, the IoT cloud 500 may obtain identification information (e.g., model information, version information, operating country information, operating system information, or the like) of the registered at least one IoT device 700 from the user terminal 100 or the corresponding at least one IoT device 700 and may transmit the identification information and information about registration completion, to the intelligent server 200. In various embodiments, identification information of the registered at least one IoT device 700 may be provided to the intelligent server 200 by the user terminal 100 without the intervention of the IoT cloud 500. According to an embodiment, the provision of the identification information of the registered at least one IoT device 700 by the user terminal 100 to the intelligent server 200 may mean the provision of account information (e.g., SAMSUNG account, GOOGLE account, or the like) mapped to the at least one IoT device 700 as well as the identification information.

In operation 39, the device management module 270 of FIG. 2A of the intelligent server 200 may identify at least one path rule associated with the registered at least one IoT device 700 in the path rule set DB 224 of FIG. 2A and/or the PR DB 231 of FIG. 2A, based on the received information (e.g., identification information and information about registration completion of the registered at least one IoT device 700). In an embodiment, the device management module 270 may determine whether the identified at least one path rule is capable of being combined with a path rule associated with another at least one IoT device 700 or the user terminal 100 on the path rule set DB 224 and/or the PR DB 231, and may update a path rule for combining path rules depending on the determination result. Alternatively, in various embodiments, the device management module 270 may update a path rule for masking or flagging a path rule (e.g., a path rule associated with the at least one IoT device 700 registered in the IoT cloud 500 or the user terminal 100) capable of being operated by the user terminal 100 among at least one path rule associated with the at least one IoT device 700, which is included in the path rule set DB 224 and/or the PR DB 231.

In operation 41, the IoT cloud 500 may transmit a feedback (e.g., a message), which functions as a notification of the registration completion of the at least one IoT device 700, to the user terminal 100, and, in operation 43, the user terminal 100 may output the feedback based on the screen interface of the app (e.g., SAMSUNG connect app).

Hereinafter, FIG. 4B that is referred to as another example associated with the registration process of an IoT device may include an operation, at least partly, the same as or similar to the operation of FIG. 4A. For example, each of operations 45, 47, 49, 51, 53, 55, 57, 59, and 61 of FIG. 4B may be the same as or similar to operations 17, 19, 21, 23, 25, 27, 29, 31, and 33 of FIG. 4A, and, hereinafter, duplicated descriptions may be omitted.

Referring to FIG. 4B, in operation 63, the IoT cloud 500 may register the at least one IoT device 700 selected from a user and may make a request for identification information (e.g., model information, version information, operating country information, operating system information, or the like) to the user terminal 100 or the registered at least one IoT device 700 to obtain the identification information.

In operation 65, the IoT cloud 500 may transmit, to the user terminal 100, a feedback (e.g., a message) that functions as a notification of the registration completion of the at least one IoT device 700.

In operation 67 and operation 69, the user terminal 100 may output the feedback through a screen interface of an app (e.g., SAMSUNG connect app) associated with the execution of a path rule and may transmit information (or registration completion information of the at least one IoT device 700) about the feedback to the intelligent server 200.

In operation 71 and operation 73, the device management module 270 of the intelligent server 200 may make a request for the identification information of the at least one IoT device 700 registered in the IoT cloud 500 to the IoT cloud 500 based on the feedback information, and the IoT cloud 500 may provide the device management module 270 with the identification information obtained in operation 63.

In operation 75, the device management module 270 may identify a path rule associated with the registered at least one IoT device 700 in the path rule set DB 224 of FIG. 2A and/or PR DB 231 of FIG. 1D based on the identification information and may update a path rule for combining the identified path rule with another path rule (e.g., a path rule associated with another at least one IoT device 700 or the user terminal 100). Alternatively, the device management module 270 may update a path rule for masking or flagging a path rule capable of being operated by the user terminal 100 among path rules associated with the at least one IoT device 700 included in the path rule set DB 224 and/or the PR DB 231.

Table 2 below may illustrate a form of the path rule type according to an embodiment. In an embodiment, it is understood that the type of the path rule is the structural or logical form of the generated path rule.

TABLE 2

| Path Rule Types | Type attribute |
|---|---|
| Normal Rule R225 | Type that cannot be combined with another path rule |
| Caller Rule R226 | Type capable of being combined with another path rule after the path rule |
| Callee Rule R227 | Type capable of being combined with another path rule before the path rule |
| Callee/Caller Rule R228 | Type capable of being combined with another path rule before or after the path rule |

As described above, the device management module 270 of FIG. 2A according to an embodiment may generate a path rule set associated with the at least one IoT device 700 of FIG. 2A, which is registered or is to be registered in the IoT cloud 500 of FIG. 2A, and a path rule set associated with the user terminal 100 of FIG. 2A (or an app mounted or installed in the user terminal 100) to build the path rule set DB 224 of FIG. 2A. For example, upon generating the path rule set, the device management module 270 may generate a path rule in the form of combining or connecting the path rule with or to another path rule, to store the path rule in the path rule set DB 224. Alternatively, the device management module 270 may exclude the combination or the link and may generate the path rule, which may be used alone, to store the path rule in the path rule set DB 224.

Referring to Table 2, at least one path rule included in the path rule set DB 224 may be implemented with a first type R225 (e.g., normal type), a second type R226 (e.g., caller type), a third type R227 (e.g., callee type), or a fourth type R228 (e.g., caller and callee types). In an embodiment, the first type R225 of the path rule may not be capable of being combined with or connected to another path rule stored in the path rule set DB 224; and the second type R226 of the path rule and the third type R227 of the path rule may be combined with or connected to at least another path rule, which comes after and before the path rule, respectively. The fourth type R228 of the path rule may be combined with or connected to at least another path rule, which comes after and before the path rule.

In an embodiment, when a new IoT device is registered in the user terminal 100 or the IoT cloud 500, the device management module 270 may identify at least one path rule associated with the newly registered IoT device with reference to the path rule set DB 224. In the case where the identified path rule is implemented with the second type R226, the third type R227, or the fourth type R228, the device management module 270 may determine whether it is possible to be combined with or connected to a path rule associated with another IoT device or the user terminal 100. For example, in the case where the second type R226, the third type R227, or the fourth type R228 of a path rule associated with another IoT device or the user terminal 100 is present in the path rule set DB 224, the device management module 270 may determine that it is possible to be combined with or connected to the path rule of the newly registered IoT device.

Table 3 below may illustrate a form of a path rule set DB according to an embodiment.

TABLE 3

Path rule set DB 224

| Representative utterance | Rule ID | Path Rule | SMS Ver1.0 | Gallery Ver1.0 | Gallery Ver2.0 | Refrigerator Model1 | Refrigerator Model2 | TV Model1 | TV Model2 |
|---|---|---|---|---|---|---|---|---|---|
| Send a SMS message | R101 | S1, S2, S3 | ○ | — | — | — | — | — | — |
| Launch a gallery | R201 | S1 | — | ○ | — | — | — | — | — |
| Launch a gallery | R202 | S'1 | — | — | ○ | — | — | — | — |
| Turn up the volume of TV | R501 | S1, S2 | — | — | — | — | — | ○ | ○ |
| Lower the temperature of a refrigerator | R601 | S1, S2, S3 | — | — | — | ○ | ○ | — | — |

Referring to Table 3, the device management module 270 of FIG. 2A may generate at least one path rule, which is associated with the at least one IoT device 700 of FIG. 2A (e.g., TV and/or a refrigerator), which is registered or is to be registered in the IoT cloud 500 of FIG. 2A, or which is associated with the user terminal 100 of FIG. 2A (e.g., the operation of an SMS app and/or a gallery app of the user terminal 100), to establish the path rule set DB 224. In this regard, the device management module 270 may generate at least one path rule, which is to be stored in the path rule set DB 224, in a type capable of being combined with another path rule or may generate at least one path rule, which may be used alone. For example, the device management module 270 may generate a path rule (e.g., operation S1 of launching a message app, operation S2 of searching for a message recipient, or operation S3 of entering a message interface with an recipient) of a user utterance (e.g., send a short message service (SMS) message) associated with the functional operation control of the user terminal 100, in the first type R225 of Table 2, which may be used alone, to store the path rule in the path rule set DB 224. Alternatively, the device management module 270 may generate a path rule of the user utterance in the second type R226 of Table 2, the third type R227 of Table 2, or the fourth type R228 of Table 2, which is capable of being combined with another path rule, to store the path rule in the path rule set DB 224, in consideration of the change (e.g., in the case where the word, the phrase, the morpheme, the context, or the like associated with another app of the at least one IoT device 700 or the user terminal 100 is added to the user utterance) in the user utterance.

Table 4 below may illustrate a form of a PR DB including the updated path rule according to an embodiment.

TABLE 4

Path rule set DB 224

| Representative utterance | Rule ID | Path Rule | SMS Ver1.0 | Gallery Ver1.0 | Gallery Ver2.0 | Refrigerator Model1 | Refrigerator Model2 | TV Model1 | TV Model2 |
|---|---|---|---|---|---|---|---|---|---|
| Send a SMS message | R101 | S1, S2, S3 | ○ | — | — | — | — | — | — |
| Launch a gallery | R201 | S1 | — | ○ | — | — | — | — | — |
| Launch a gallery | R202 | S'1 | — | — | ○ | — | — | — | — |
| Turn up the volume of TV | R501 | S1, S2 | — | — | — | — | — | ○ | ○ |
| Lower the temperature of a refrigerator | R601 | S1, S2, S3 | — | — | — | ○ | ○ | — | — |
| Show me the inside photo of a refrigerator in a gallery | R603 | S1, S2, S3, S4 (229a) | — | ○ | — | ○ | ○ | — | — |
| Show me the inside photo of a refrigerator in a gallery | R604 | S'1, S'2, S'3, S'4 (229a) | — | — | ○ | ○ | ○ | — | — |

In an embodiment, in the case where a new IoT device (e.g., a refrigerator) is registered in the IoT cloud 500 or the user terminal 100, the device management module 270 may identify the second type R226, the third type R227, or the fourth type R228 of the path rule associated with the IoT device (e.g., a refrigerator) newly registered in the path rule set DB 224. In the case where the second type R226, the third type R227, or the fourth type R228 of a path rule associated with the newly registered IoT device (e.g., a refrigerator) is present, the device management module 270 may determine whether a path rule (e.g., the second type R226, the third type R227, or the fourth type R228 of a path rule associated with another IoT device or the user terminal 100) capable of being combined with a path rule of the newly registered IoT device (e.g., a refrigerator) is included in the path rule set DB 224.

For example, it is understood that the path rule set DB 224 according to Table 4 includes only the specific path rule (e.g., a path rule associated with the operation of a gallery app) associated with the user terminal 100 as a path rule capable of being combined with a path rule of the newly registered IoT device (e.g., a refrigerator). As such, the device management module 270 may combine a path rule of the newly registered IoT device (e.g., a refrigerator) with a specific path rule associated with the user terminal 100 based on each path rule type and may add path rule 229*a*, which is updated based on the combination, to the path rule set DB 224.

Table 5 below may illustrate a form of a PR DB including the updated path rule according to an embodiment.

TABLE 5

| Path rule set DB 224 | | | | | | | | | |
|---|---|---|---|---|---|---|---|---|---|
| Representative utterance | Rule ID | Path Rule | SMS Ver1.0 | Gallery Ver1.0 | Gallery Ver2.0 | Refrigerator Model1 | Refrigerator Model2 | TV Model1 | TV Model2 |
| Send a SMS message | R101 | S1, S2, S3 | ○ | — | — | — | — | — | — |
| Launch a gallery | R201 | S1 | — | ○ | — | — | — | — | — |
| Launch a gallery | R202 | S'1 | — | — | ○ | — | — | — | — |
| Turn up the volume of TV | R501 | S1, S2 | — | — | — | — | — | ○ | ○ |
| Show me a photo in gallery through TV | R502 | S1, S2, S3 (229b) | — | ○ | — | — | — | ○ | — |
| Show me a photo in gallery through TV | R503 | S'1, S'2, S'3 (229b) | — | — | ○ | — | — | — | ○ |
| Lower the temperature of a refrigerator | R601 | S1, S2, S3 | — | — | — | ○ | ○ | — | — |
| Show me the inside photo of a refrigerator through TV | R602 | S1, S2, S3, S4, S5 (229c) | — | — | — | ○ | ○ | ○ | ○ |
| Show me the inside photo of a refrigerator in a gallery | R603 | S1, S2, S3, S4 | — | ○ | — | ○ | ○ | — | — |
| Show me the inside photo of a refrigerator in a gallery | R604 | S'1, S'2, S'3, S'4 | — | — | ○ | ○ | ○ | — | — |

In an embodiment, after the path rule described with reference to Table 4 is updated, another new IoT device (e.g., TV) may be registered in the IoT cloud 500 or the user terminal 100. In this case, in the same or similar manner as described above, the device management module 270 may identify the path rule and type of the IoT device (e.g., TV) newly registered in the path rule set DB 224 and may determine whether a path rule capable of being combined with the identified path rule is included in the path rule set DB 224.

For example, it is understood that the path rule set DB 224 according to Table 5 includes a specific path rule (e.g., a path rule associated with the operation of a gallery app) associated with the user terminal 100 and a specific path rule associated with another IoT device (e.g., a refrigerator) as a path rule capable of being combined with a path rule associated with the newly registered IoT device (e.g., TV). In this case, the device management module 270 may generate a path rule, which is updated based on the path rule type of each of the combinable path rules. For example, the device management module 270 may generate path rule 229b, which is updated by combining the path rule of the newly registered IoT device (e.g., TV) with the specific path rule (e.g., a path rule associated with the operation of a gallery app) of the user terminal 100, and/or path rule 229c, which is updated by combining the path rule of the newly registered IoT device (e.g., TV) with the path rule of another IoT device (e.g., a refrigerator) to add the generated path rule 229b and the generated path rule 229c to the path rule set DB 224.

In various embodiments, as described above, the device management module 270 may store the updated path rule in the PR DB 231 of FIG. 2A as well as the path rule set DB 224 and may transmit the identification information of an IoT device associated with the updated path rule, to the NLU module 220 of FIG. 1D.

Figure 5:
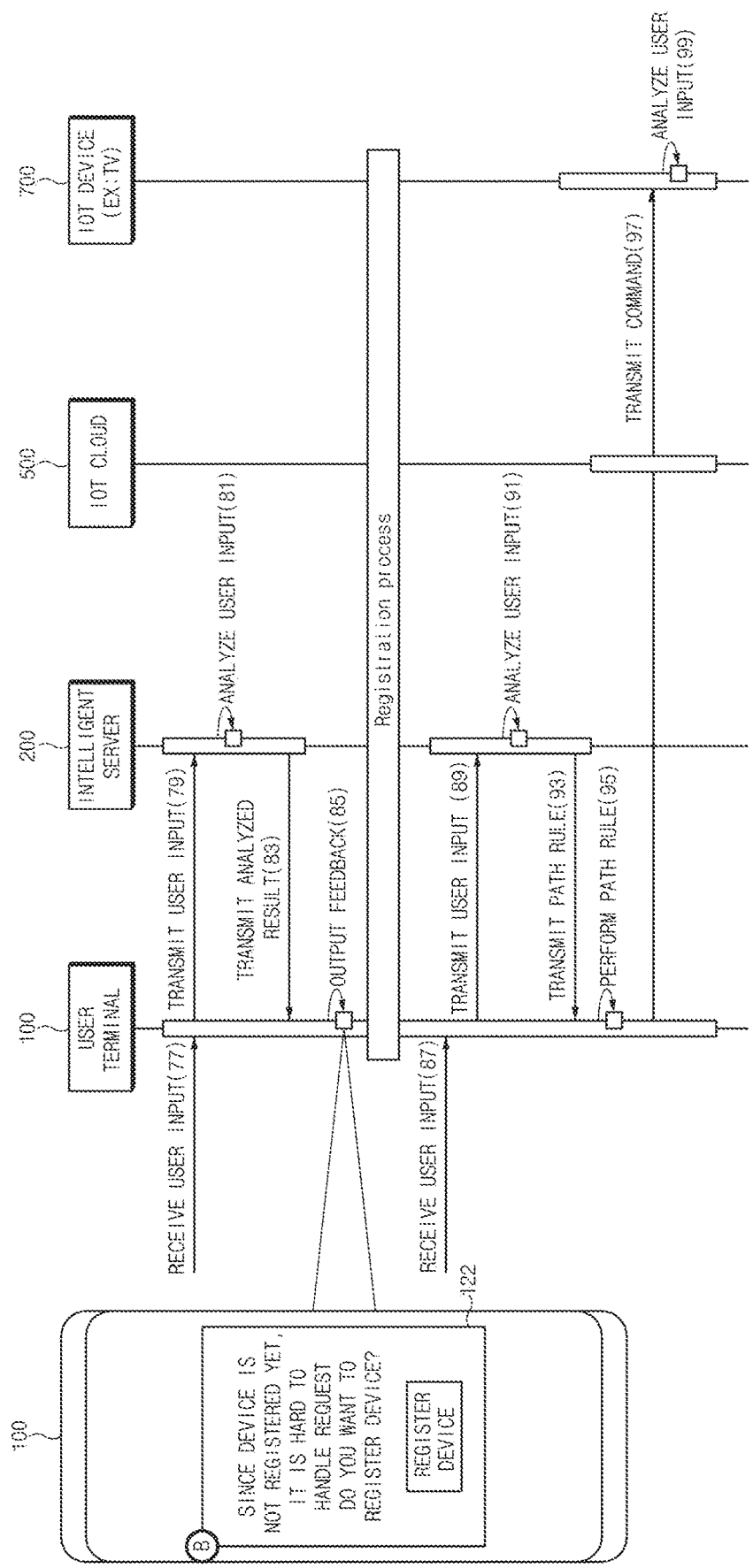
FIG. 5 is a view illustrating a process of processing a user input associated with an IoT device, according to an embodiment of the disclosure.

FIG. 5 is a view illustrating a process of processing a user input associated with an IoT device, according to an embodiment of the disclosure.

In an embodiment, in an operation of processing a user utterance associated with the functional operation control of a specific IoT device (e.g., TV), the user terminal 100 may output the specified type of a feedback. For example, in the case where a path rule associated with the specific IoT device (e.g., TV) is not included in the above-described path rule set DB 224 of FIG. 2A or the above-described PR DB 231 of FIG. 2A, the user terminal 100 may output a feedback (e.g., a message) including a specified text (e.g., since the corresponding device is not registered yet, it is hard to handle the request. Do you want to register a device?).

Referring to FIG. 5, in operation 77 and operation 79, the user terminal 100 may receive a user input according to a user utterance (e.g., show me a photo captured yesterday through TV) including a specific command or a specific intent and may transmit the user input to the intelligent server 200.

In operation 81, the intelligent server 200 may analyze the user input with regard to the provision of a path rule corresponding to the user input. For example, the ASR module 210 of FIG. 2A of the intelligent server 200 may convert a user input into text data, and the NLU module 220 of FIG. 2A may analyze the intent of the user utterance based on the text data. In an embodiment, when the intent of the user utterance is derived as being associated with the functional operation control of the specific at least one IoT device 700 (e.g., TV), the NLU module 220 may determine whether the path rule associated with the specific at least one IoT device 700 (e.g., TV) is present in the path rule set DB 224 of FIG. 2A and/or the PR DB 231.

In the case where the path rule associated with the specific at least one IoT device 700 (e.g., TV) is not present, in operation 83, the NLU module 220 may transmit information (e.g., analysis result information of a user input or determination information about whether a path rule of the specific at least one IoT device 700 (e.g., TV) is present in the path rule set DB 224 and/or the PR DB 231) to a user terminal. In various embodiments, it is understood that the absence of a path rule of the specific at least one IoT device 700 (e.g., TV) in the path rule set DB 224 and/or the PR DB 231 is in a state where the specific at least one IoT device 700 (e.g., TV) is not registered in the IoT cloud 500 or the user terminal 100 or in a state where a path rule is not generated in advance with regard to the subsequent registration of the unregistered specific at least one IoT device 700 (e.g., TV).

In operation 85, the user terminal 100 may generate the specified type of a feedback 122 based on information received from the NLU module 220 and may output the feedback 122 to the screen area of the display 120 in FIG. 1B. In various embodiments, the user terminal 100 may output specified sound (e.g., alarm) or vibration of a specified pattern together with the output of the feedback 122.

In an embodiment, the feedback 122 may include an object (or a button or tap) (e.g., device registration) for supporting the registration of the specific at least one IoT device 700 (e.g., TV). In the case where a user input (e.g., touch input) is applied to the object, at least part of components of the IoT system 20 of FIG. 2A may perform registration process of the at least one IoT device 700 described with reference to FIG. 4A or 4B.

As the registration process is performed, at least one operation (e.g., operations 87, 89, 91, 93, 95, 97, and 99) to be described below may be associated with the processing of a user utterance (e.g., show me a photo captured yesterday through TV) after the specific at least one IoT device 700 (e.g., TV) is registered in the IoT cloud 500 or the user terminal 100, and operation 87 and operation 89 may be performed the same as or similar to operation 77 and operation 79.

In operation 91 and operation 93, the NLU module 220 of the intelligent server 200 may identify at least one path rule associated with the specific at least one IoT device 700 (e.g., TV) according to the user utterance intent in the path rule set DB 224 and/or the PR DB 231 based on the derived user utterance intent. The NLU module 220 may select a path rule corresponding to the user utterance intent among the identified at least one path rule and may transmit the selected path rule to the user terminal 100.

In operation 95 and operation 97, the first intelligent agent 151 of FIG. 2A of the user terminal 100 may transmit the received path rule to the execution manager module 147 of FIG. 1B to execute the path rule, and the IoT agent 157 of FIG. 2A may transmit a command (or signal) for outputting specific data (e.g., image data associated with a photo captured yesterday) according to the execution of the path rule, to the specific at least one IoT device 700 (e.g., TV) corresponding to the user utterance intent. In this operation, the IoT agent 157 may transmit the command (or signal) to the specific at least one IoT device 700 (e.g., TV) or may transmit to the specific at least one IoT device 700 (e.g., TV) via the IoT cloud 500. As such, in operation 99, the specific at least one IoT device 700 (e.g., TV) may process the command (or signal) to perform a functional operation (e.g., output the image data associated with a photo captured yesterday) corresponding to a user utterance.

Table 6 below may illustrate a form of a PR DB according to an embodiment.

TABLE 6

PR DB 231

| Rule ID | Path Rule | SMS Ver1.0 | Gallery Ver1.0 | Gallery Ver2.0 | Refrigerator Model1 | Refrigerator Model2 | TV Model1 | TV Model2 |
|---|---|---|---|---|---|---|---|---|
| R101 | S1, S2, S3 | ○ | — | — | — | — | — | — |
| R201 | S1 | — | ○ | — | — | — | — | — |
| R202 | S'1 | — | — | ○ | — | — | — | — |
| R501 | S1, S2 | — | — | — | — | — | ○ | ○ |
| R502 | S1, S2, S3 | — | ○ | — | — | — | ○ | — |
| R503 | S'1, S'2, S'3 | — | — | ○ | — | — | — | ○ |
| R601 | S1, S2, S3 | — | — | — | ○ | ○ | — | — |
| R602 | S1, S2, S3, S4, S5 | — | — | — | ○ | ○ | ○ | ○ |
| R603 | S1, S2, S3, S4 | — | ○ | — | ○ | ○ | — | — |
| R604 | S'1, S'2, S'3, S'4 | — | — | ○ | ○ | ○ | — | — |

In an embodiment, the PR DB 231 of the intelligent server 200 of FIG. 2A may include at least one path rule associated with the functional operation of the at least one IoT device 700 of FIG. 2A or the user terminal 100 of FIG. 2A. For example, in the case where the specific IoT at least one device 700 is registered in the IoT cloud 500 of FIG. 2A or the user terminal 100, the device management module 270 of FIG. 2A of the intelligent server 200 of FIG. 2A may combine a path rule of the specific at least one IoT device 700, which is stored in the path rule set DB 224 of FIG. 2A, with at least another path rule (e.g., a path rule associated with another at least one IoT device 700 or the user terminal 100) and may store the path rule, which is updated depending on the combination, in the PR DB 231. Alternatively, regardless of the update according to the combination between path rules, the device management module 270 may generate at least one path rule associated with the at least one IoT device 700, which is to be registered or is capable of being registered later in the IoT cloud 500 or the user terminal 100, to store the at least one path rule in the PR DB 231.

In this regard, referring to Table 6, at least one path rule (or path rule ID) in the PR DB 231 may be mapped to the relevant app and/or the relevant IoT device (e.g., an app and/or an IoT device controlled through the execution of the path rule) and may be stored. As described above, an app and/or the at least one IoT device 700 mapped to each at least one path rule may have various pieces of identification information (or profile information) (e.g., type, model, version, operating system, or device name) regardless of whether to be mounted or registered in the user terminal 100. In an embodiment described through Table 6, it is understood that a message app (e.g., SMS Ver 1.0) of a specific version, a gallery app (e.g., gallery Ver 2.0) of a specific version, or an IoT device (e.g., refrigerator model 1) of a specific model is mounted or registered in the user terminal 100.

In an embodiment, the device management module 270 may identify a path rule associated with the registered at least one IoT device 700 (e.g., refrigerator model 1) in the PR DB 231 based on identification information, which is provided from the IoT cloud 500, about the at least one IoT device 700 which is registered in the user terminal 100 or the IoT cloud 500. Alternatively, the device management module 270 may receive identification information about an app (e.g., SMS Ver 1.0 and/or gallery Ver 2.0) mounted or installed in the user terminal 100, from the user terminal 100 and then may identify a path rule, which is associated with the app capable of being executed by the user terminal 100, from among path rules associated with the app stored in the PR DB 231. Alternatively, the device management module 270 may identify a path rule in which the app (e.g., SMS Ver 1.0 and/or gallery Ver 2.0) capable of being executed by the user terminal 100 is linked to the registered at least one IoT device 700 (e.g., refrigerator model 1), based on the pieces of identification information.

Table 7 below may illustrate a form of a table built based on the PR DB of Table 6, according to an embodiment.

TABLE 7

Table 233

| Flag | Representative utterance | Rule ID | Path Rule |
|---|---|---|---|
| ○ | Send a SMS message | R101 | S1, S2, S3 |
| X | Launch a gallery | R201 | S1 |
| ○ | Launch a gallery | R202 | S'1 |
| X | Turn up the volume of TV | R501 | S1, S2 |

TABLE 7-continued

Table 233

| Flag | Representative utterance | Rule ID | Path Rule |
|---|---|---|---|
| X | Show me a photo in gallery through TV | R502 | S1, S2, S3 |
| X | Show me a photo in gallery through TV | R503 | S'1, S'2, S'3 |
| ○ | Lower the temperature of a refrigerator | R601 | S1, S2, S3 |
| X | Show me the inside photo of a refrigerator through TV | R602 | S1, S2, S3, S4, S5 |
| ○ | Show me the inside photo of a refrigerator in a gallery | R603 | S1, S2, S3, S4 |
| X | Show me the inside photo of a refrigerator in a gallery | R604 | S'1, S'2, S'3, S'4 |

In an embodiment, the device management module 270 may establish a separate Table 233 based on the PR DB 231 of Table 6. In this regard, for example, the device management module 270 may include at least one path rule, which is stored in the PR DB 231 of Table 6, in the Table 233 in the form of a list. According to an embodiment, the device management module 270 may assign a specified flag (or marking) to the identified at least one path rule (e.g., a path rule associated with an app (e.g., SMS Ver 1.0 and/or gallery Ver 2.0) capable of being executed by the registered IoT device (e.g., refrigerator model 1) and/or the user terminal) among at least one path rule included in the Table 233. For example, the device management module 270 may assign the flag to the path rule associated with a first gallery app (e.g., gallery Ver 2.0) currently mounted in the user terminal 100; in this case, the flag may not be assigned to the path rule associated with the at least one IoT device 700 (e.g., TV), which is not registered in the user terminal 100 or the IoT cloud 500, from among path rules associated with the first gallery app. As such, the device management module 270 may assign the flag to only the path rule associated with the app (e.g., SMS Ver 1.0 and/or gallery Ver 2.0) capable of being executed by the at least one IoT device 700 (e.g., refrigerator model 1) registered in the user terminal 100 or the IoT cloud 500 and/or the user terminal 100. In an embodiment, with regard to the processing of a user input according to a user utterance, the NLU module 220 of FIG. 2A of the intelligent server 200 may select at least one of path rules (e.g., path rules to which the flag is assigned) capable of being executed by the user terminal 100, with reference to the flag on the Table 233.

In various embodiments, account information (e.g., SAMSUNG account information or GOOGLE account information) operated by the user terminal 100 may be mapped to the path rule (e.g., path rule ID R601 and/or R603), to which the flag is assigned, associated with the at least one IoT device 700 (e.g., refrigerator model 1).

Table 8 below may illustrate a form of a sub PR DB 234 established based on the PR DB of Table 6, according to an embodiment.

TABLE 8

Sub path rule database 234

| Representative utterance | Rule ID | Path Rule |
|---|---|---|
| Send a SMS message | R101 | S1, S2, S3 |
| Launch a gallery | R202 | S'1 |
| Lower the temperature of a refrigerator | R601 | S1, S2, S3 |
| Show me the inside photo of a refrigerator in a gallery | R603 | S1, S2, S3, S4 |

Referring to Table 8, as described above, the device management module 270 may copy data associated with the identified at least one path rule (e.g., a path rule associated with an app (e.g., SMS Ver 1.0 and/or gallery Ver 2.0) capable of being operated by the registered IoT device (e.g., refrigerator model 1) and/or a user terminal) to establish the sub PR DB 234. In an embodiment, the device management module 270 may manage only the path rule, which is capable of being performed by the user terminal 100, through the sub PR DB 234. As such, the intelligent server 200 may further include the sub PR DB (e.g., the sub PR DB 234 of FIG. 2A) in addition to the path rule set DB 224 and/or the PR DB 231; upon generating a user utterance, the NLU module 220 may select a path rule corresponding to the user utterance intent with reference to the sub PR DB 234.

In various embodiments, in the case where a new app is installed in the user terminal 100 or a new at least one IoT device 700 is registered in the user terminal 100, the device management module 270 may update the assignment of a flag to the path rule or may update the sub PR DB 234, based on identification information about the new app or the new at least one IoT device 700.

Table 9 below may illustrate a form of a PR DB according to an embodiment. For example, the PR DB described with reference to Table 9 may be established the same as or similar to the PR DB described above through Table 6. In addition, in an embodiment associated with Table 9, it is understood that a message app (e.g., SMS Ver 1.0) of a specific version, a gallery app (e.g., gallery Ver 2.0) of a specific version, or an IoT device (e.g., refrigerator model 1) of a specific model is mounted or registered in a user terminal.

TABLE 9

PR DB 231

| Representative utterance | Rule ID | Path Rule | SMS Ver1.0 | Gallery Ver1.0 | Gallery Ver2.0 | Refrigerator Model1 | Refrigerator Model2 | TV Model1 | TV Model2 |
|---|---|---|---|---|---|---|---|---|---|
| Send a SMS message | R101 | S1, S2, S3 | ○ | — | — | — | — | — | — |
| Launch a gallery | R201 | S1 | — | ○ | — | — | — | — | — |
| Launch a gallery | R202 | S'1 | — | — | ○ | — | — | — | — |

TABLE 9-continued

PR DB 231

| Representative utterance | Rule ID | Path Rule | SMS Ver1.0 | Gallery Ver1.0 | Gallery Ver2.0 | Refrigerator Model1 | Refrigerator Model2 | TV Model1 | TV Model2 |
|---|---|---|---|---|---|---|---|---|---|
| Turn up the volume of TV | R501 | S1, S2 | — | — | — | — | — | ○ | ○ |
| Show me a photo in gallery through TV | R502 | S1, S2, S3 | — | ○ | — | — | — | ○ | — |
| Show me a photo in gallery through TV | R503 | S'1, S'2, S'3 | — | — | ○ | — | — | — | ○ |
| Lower the temperature of a refrigerator | R601 | S1, S2, S3 | — | — | — | ○ | ○ | — | — |
| Show me the inside photo of a refrigerator through TV | R602 | S1, S2, S3, S4, S5 (239) | — | — | — | ○ | ○ | ○ | ○ |
| Show me the inside photo of a refrigerator in a gallery | R603 | S1, S2, S3, S4 (235) | — | ○ | — | ○ | ○ | — | — |
| Show me the inside photo of a refrigerator in a gallery | R604 | S'1, S'2, S'3, S'4 (237) | — | — | ○ | ○ | ○ | — | — |

As described above, upon generating a user utterance (e.g., show me the inside photo of a refrigerator in a gallery) including a specific command or intent, the ASR module 210 of FIG. 2A of the intelligent server 200 of FIG. 2A may convert a user input (e.g., voice input) according to the user utterance into text data, and the NLU module 220 of FIG. 2A may derive the intent of the user utterance based on the text data. In this regard, referring to Table 9, the NLU module 220 may identify at least one path rule 235 and/or 237 corresponding to the user utterance (or user utterance intent) among at least one path rule included in the PR DB 231, based on the derived intent of the user utterance. At this time, in the case of each identified at least one path rule 235 and/or 237, pieces of identification information (or profile information) (e.g., model information, version information, or the like) about the relevant app or the relevant IoT device may be the same as or different from each other.

In an embodiment, the device management module 270 of FIG. 2A may identify the at least one path rule 235 and/or 237 associated with the app and/or the IoT device in the PR DB 231, based on pieces of identification information about an app (e.g., SMS Ver 1.0 and/or gallery Ver 2.0) mounted in the user terminal 100 and/or an IoT device (e.g., refrigerator model 1) registered in the user terminal 100. The device management module 270 may provide information about the path rule 235 (e.g., a path rule corresponding to the version of an app mounted in the user terminal 100 and/or the model of the IoT device registered in the user terminal 100) capable of being executed by the user terminal 100 among the identified at least one path rule 235 and/or 237, to the NLU module 220. The NLU module 220 may select the path rule 235 capable of being executed by the user terminal 100, based on information received from the device management module 270 and may transmit the selected path rule 235 to the user terminal 100.

In an embodiment, a user utterance (e.g., show me the inside photo of a refrigerator through TV) associated with the functional operation control of an app not installed in the user terminal 100 or an IoT device (e.g., TV) not registered in the user terminal 100 may be generated. In this case, path rule 239 associated with an IoT device (e.g., refrigerator and TV) corresponding to the user utterance may be included in the PR DB 231 (e.g., a path rule generated in consideration of late registration). However, since at least part (e.g., TV) of corresponding IoT devices is not registered in the user terminal 100, it may be impossible for the user terminal 100 to perform the path rule 239 associated with the unregistered IoT device (e.g., TV). In this regard, the NLU module 220 may identify the path rule 239 corresponding to a user utterance (or user utterance intent) in the PR DB 231. However, since receiving path rule information capable of being performed by the user terminal 100 from the device management module 270, the NLU module 220 may not select the path rule 239 associated with the unregistered IoT device (e.g., TV). In this case, the NLU module 220 may transmit information indicating that it is impossible to process a user utterance (or a user input), to the NLG module 250 of FIG. 1D. The NLG module 250 may generate a feedback (e.g., the feedback 122 of FIG. 5) in the form of a specified text, based on information from the NLU module 220 and may transmit the feedback 122 to the user terminal 100. Alternatively, the NLG module 250 may transmit the feedback in the form of a text to the TTS module 260 of FIG. 1D, and the TTS module 260 may convert the received feedback of a text format into the feedback of a voice format to transmit the feedback of a voice format to the user terminal 100. As such, the user terminal 100 may output the feedback based on the display 120 of FIG. 1B or the speaker 130 of FIG. 1B to allow a user to register an IoT device (e.g., TV) included in the user utterance (e.g., show me the inside photo of a refrigerator in TV).

In various embodiments, in an operation of performing a path rule from the NLU module 220 of the intelligent server 200, the user terminal 100 may receive context information from at least one IoT device associated with the path rule. In this regard, when performing the path rule of the user terminal 100, the IoT device may receive a specific command (or signal) to be used to perform a task corresponding to a user utterance, from the user terminal 100. In this operation, at least part (hereinafter, referred to as a "first IoT device") of at least one IoT device corresponding to the user utterance may fail to normally process the specific command received from the user terminal 100 due to an unstable communication state, the lack of available power, a functional malfunction, or the like. In this case, the first IoT device may transmit context information including information indicating the unprocessed state of the specific command, to the user terminal 100.

In an embodiment, the user terminal 100 may transmit at least part of the context information received from the first IoT device to the intelligent server 200; and the NLU module 220 of the intelligent server 200 may change at least part of path rules, which are provided in advance to the user terminal 100, or may generate or select a new path rule, based on the received context information. For example, the NLU module 220 may include a command that allows the first IoT device to process the specific command depending on the previously provided path rule at a point in time when the unstable communication state or the functional malfunction is improved or at a point in time when available power is secured, to transmit the command to the user terminal 100. Alternatively, in the case where the NLU module 220 has the operating environment in which the first IoT device can handle the specific command normally, the NLU module 220 may generate or select a path rule including a command for transmitting context information about this to the user terminal 100, and then may transmit the path rule to the user terminal 100.

The user terminal 100 may process a user utterance of various scenarios to control an IoT device in addition to the user utterance (e.g., send a SMS message, launch a gallery, turn up the volume of TV, lower the temperature of a refrigerator, show me the inside photo of a refrigerator in a gallery, or the like) described above.

For example, the user terminal 100 may process a user utterance (e.g., check the state of an air conditioner) for requesting state information of an IoT device. In this case, the user terminal 100 may receive the path rule corresponding to the user utterance from the intelligent server 200 and may perform at least one operation constituting the path rule. In an embodiment, the path rule may include an operation of making a request for state information to the IoT device, based on the execution of a specific app (e.g., SAMSUNG connect app) installed in the user terminal 100, and then the user terminal 100 may receive state information (e.g., turn-on information) from the IoT device to output the state information in the form of a text or a voice. When a user utterance (e.g., turn off an air conditioner) is generated in response to the output of the state information, the user terminal 100 may transmit a user input according to the user utterance to the intelligent server 200, and the intelligent server 200 may recognize the user input to generate the corresponding path rule or select a path rule from the path rule set DB 224 and/or the PR DB 231 to transmit the generated or selected path rule to the user terminal 100.

For another example, the user terminal 100 may process a user utterance (e.g., show me a message on the display of a vehicle) that allows an IoT device to execute the function (e.g., display function) of the user terminal 100. In an embodiment, the path rule generated or selected by the intelligent server 200 in response to the user utterance may include an operation of searching for a message received by the user terminal 100 during a specified time range and an operation of transmitting the found message to the vehicle connected (e.g., Bluetooth, Wi-Fi, or the like) to the user terminal 100. The user terminal 100 may perform the path rule according to the above-described operations to output the message received from an arbitrary external device, to the vehicle, and the vehicle may output the received message to a display device.

According to an embodiment, an electronic device (e.g., the user terminal 100 of FIG. 1B) may include a housing, a touch screen display (e.g., the display 120 of FIG. 1B), which is accommodated in the housing and at least part of which is exposed visually, a microphone (e.g., the microphone 111 of FIG. 1C) accommodated in the housing, a wireless communication circuit, a processor (e.g., the processor 150 of FIG. 1B) operatively connected to the touch screen display, the microphone, and the wireless communication circuit, and a memory (e.g., the memory 140 of FIG. 1B) operatively connected to the processor.

According to various embodiments, the memory stores a software program including a user interface supporting the control of at least one external device based on a user account.

According to various embodiments, the memory may store at least one instruction that, when executed, causes the processor to control the wireless communication circuit to receive a first user input for connecting the electronic device to a first external device, via the user interface, control the wireless communication circuit to transmit first information corresponding to the user account and second information corresponding to the first external device, to a second external device, control the wireless communication circuit to receive a second user input corresponding to a request for performing at least part of a task by using the first external device, via the touch screen display or the microphone, control the wireless communication circuit to transmit data corresponding to the second user input to the second external device, control the wireless communication circuit to receive a first response including a sequence of states of the task to be used when the at least part of the task is performed by the first external device, from the second external device, and after receiving the first response, control to perform, by the first external device, the at least part of the task depending on the sequence.

According to various embodiments, the at least one instruction further causes the processor, as at least part of the performing, control the wireless communication circuit to transmit at least one command to be used such that the at least part of the task is performed by the first external device depending on the sequence, to the first external device.

According to various embodiments, the at least one instruction further causes the processor to control the wireless communication circuit to receive context information corresponding to the first external device from the first external device with regard to the execution of the at least part of the task of the first external device.

According to various embodiments, the at least one instruction further causes the processor to control the wireless communication circuit to transmit at least part of the received context information to the second external device.

According to various embodiments, the at least one instruction further causes the processor to control the wireless communication circuit to receive a second response including the sequence of the states based on the at least part of the context information, from the second external device.

According to various embodiments, the electronic device may further include a physical button exposed to one area of the housing.

According to various embodiments, the at least one instruction further causes the processor to be in a state of receiving the second user input, after receiving a third user input through the physical button.

According to various embodiments, the at least one instruction further causes the processor to control the wireless communication circuit to receive an issued token from a third external device associated with the software program based at least partly on the user account, and control the wireless communication circuit to transmit the token to the first external device so as to be used for the connection between the electronic device and the first external device.

According to various embodiments, the at least one instruction further causes the processor to control to output a specified feedback when the connection of the first external device is completed, as at least part of an operation of connecting to the first external device.

According to various embodiments, a server (e.g., the intelligent server 200 of FIG. 1B) is provided. The server may include a wireless communication circuit, a memory storing states of a task, and a processor.

According to various embodiments, the processor of the server may be configured to control the wireless communication circuit to receive first data including first information corresponding to a first user account and second information corresponding to a first external device associated with the first user account, from a second external device, control the wireless communication circuit 1 to receive second data corresponding to a request that allows the first external device to perform at least part of the task, from the second external device, in response to receiving the second data, determine a sequence associated with at least part of the states based at least partly on the first data, and control the wireless communication circuit to transmit a response including the determined sequence to the second external device.

According to various embodiments, the memory of the server may store a plurality of sequences.

According to various embodiments, the processor of the server may identify the sequence of the stored plurality of sequences.

According to various embodiments, the processor of the server may be configured to assign a specified flag indicating that the sequence is associated with the first user account, to the sequence.

According to various embodiments, the processor of the server may be configured to combine a first sequence with a second sequence among the stored plurality of sequences to generate the sequence.

According to various embodiments, the processor of the server may be configured to perform the combination when a type of the first sequence corresponds to a type of the second sequence.

According to various embodiments, the processor of the server may be configured to control the wireless communication circuit to receive context information corresponding to the first external device from the second external device.

According to various embodiments, the processor of the server may change at least part of the determined sequence based at least partly on the context information.

According to various embodiments, the processor of the server may control the wireless communication circuit to transmit a response including the changed sequence, to the second external device.

According to various embodiments, the server may include a computer-readable storage medium storing at least one instruction.

According to various embodiments, the at least one instruction may be executed by at least one processor that the server includes.

According to various embodiments, the processor of the server may be configured to control the wireless communication circuit to receive first data including first information corresponding to a first user account and second information corresponding to a first external device associated with the first user account, from a second external device, control the wireless communication circuit to receive second data corresponding to a request that allows the first external device to perform at least part of a task, from the second external device, in response to receiving the second data, determine a sequence associated with at least part of states of a previously stored task based at least partly on the first data, and control the wireless communication circuit to transmit a response including the determined sequence to the second external device.

According to various embodiments, the processor of the server may be further configured to identify the sequence of pre-stored plurality of sequences.

According to various embodiments, the processor of the server may be further configured to assign a specified flag indicating that the sequence is associated with the first user account, to the sequence.

According to various embodiments, the processor of the server may be configured to combine a first sequence with a second sequence among the stored plurality of sequences to generate the sequence.

According to various embodiments, the processor of the server may be further configured to determine whether a type of the first sequence corresponds to a type of the second sequence.

According to various embodiments, the processor of the server may be further configured to control the wireless communication circuit to receive context information corresponding to the first external device, from the second external device.

According to various embodiments, the processor of the server may be further configured to change at least part of the determined sequence based at least partly on the context information.

According to various embodiments, the processor of the server may be further configured to control the wireless communication circuit to transmit a response including the changed sequence to the second external device.

According to various embodiments, an electronic system (e.g., the IoT system 20 of FIG. 2A) is provided. The electronic system may include a microphone, a communication circuit, at least one first processor electrically connected to the microphone and the communication circuit, and a user terminal (e.g., the user terminal 100 of FIG. 2A) including a memory electrically connected to the first processor. The electronic system may further include a communication interface, at least one second processor electrically connected to the communication interface, and a first server (e.g., the intelligent server 200 of FIG. 2A) including a second memory electrically connected to the second processor. The electronic system may further include a third server (e.g., the IoT cloud 500 of FIG. 2A) integrally managing at least one external device.

According to various embodiments, the first memory may store at least one instruction that, when executed, causes the first processor to control the communication circuit to receive a voice input of a user based on the microphone and to provide the second processor with first data associated with the voice input based on the communication circuit.

According to various embodiments, the second memory may store at least one instruction that, when executed, causes the second processor, in an operation of processing the first data based on at least one of an ASR module and an NLU module, to obtain information about at least one first external device associated with the first data from the third server, determine at least one first sequence associated with states of the first external device, based on information about the first external device, when a specified condition between the first sequence and at least one second sequence associated with states of the user terminal or the at least one external device, which is previously stored in the second memory, combine at least part of the first sequence with at least part of the second sequence to determine at least one third sequence, and to control the communication circuit to transmit at least one of the first sequence, the second sequence, and the third sequence to the user terminal with regard to the processing of the first data.

Figure 6:
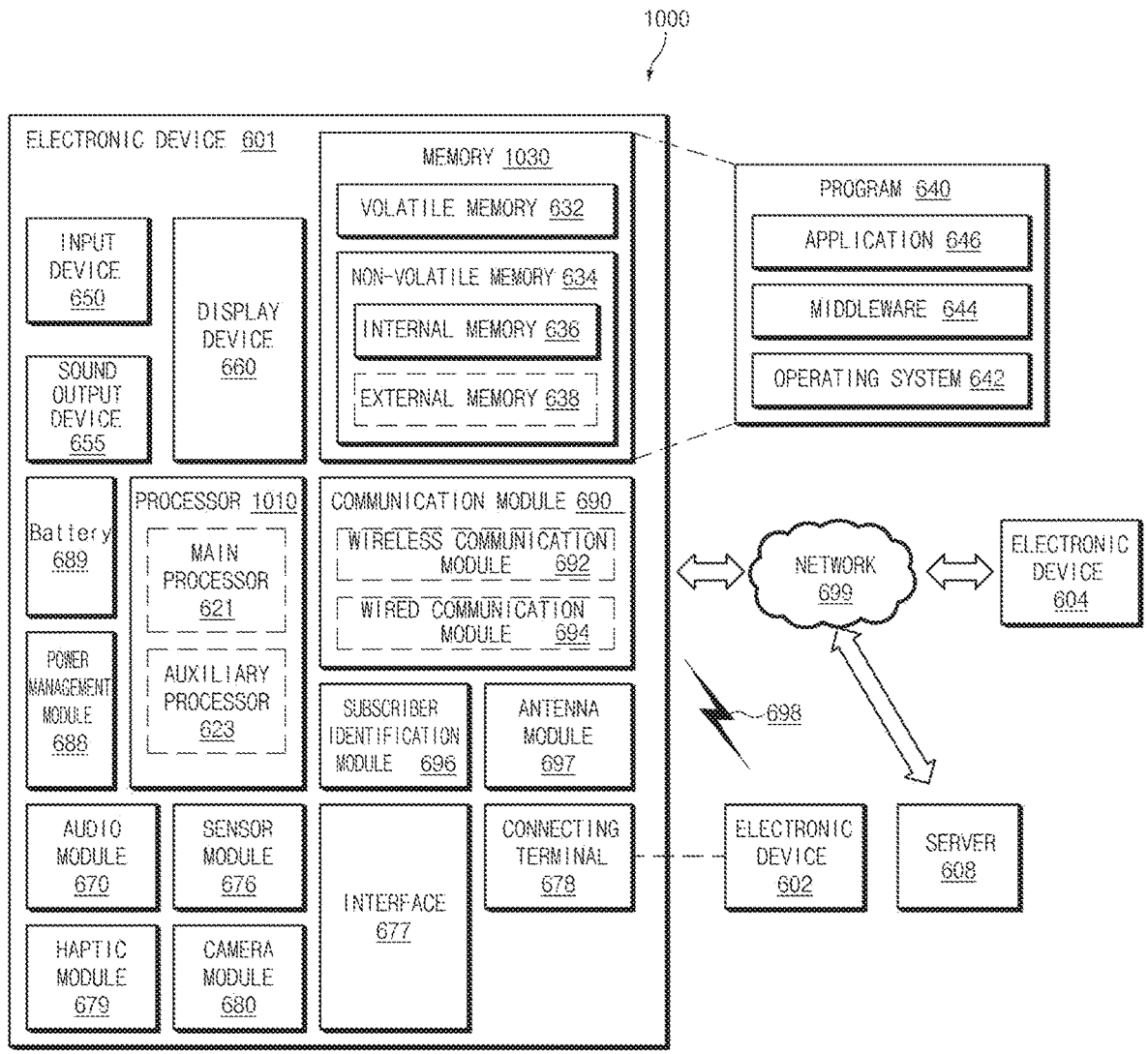
FIG. 6 is a diagram illustrating an electronic device in a network environment, according to an embodiment of the disclosure.

FIG. 6 is a diagram of an electronic device in a network environment according to an embodiment of the disclosure.

Referring to FIG. 6, the electronic device 601 (e.g., the user terminal 100 of FIG. 1B) may communicate with a first external electronic device 602 through a first network 698 (e.g., a short-range wireless communication) or may communicate with a second external electronic device 604 or a server 608 through a second network 699 (e.g., a long-distance wireless communication) in a network environment 1000. According to an embodiment, the electronic device 601 may communicate with the second external electronic device 604 through the server 608. According to an embodiment, the electronic device 601 may include a processor 1010 (e.g., the processor 150 of FIG. 1B), a memory 1030 (e.g., the memory 140 of FIG. 1B), an input device 650 (e.g., the input module 110 of FIG. 1B), a sound output device 655 (e.g., the speaker 130 of FIG. 1B), a display device 660 (e.g., the display 120 of FIG. 1B), an audio module 670, a sensor module 676, an interface 677, a haptic module 679, a camera module 680, a power management module 688, a battery 689, a communication module 690, a subscriber identification module 696, and an antenna module 697. According to some embodiments, at least one (e.g., the display device 660 or the camera module 680) among components of the electronic device 601 may be omitted or other components may be added to the electronic device 601. According to some embodiments, some components may be integrated and implemented as in the case of the sensor module 676 (e.g., a fingerprint sensor, an iris sensor, or an illuminance sensor) embedded in the display device 660 (e.g., a display).

The processor 1010 may operate, for example, software (e.g., a program 640) to control at least one of other components (e.g., a hardware or software component) of the electronic device 601 connected to the processor 1010 and may process and compute a variety of data. The processor 1010 may load a command set or data, which is received from other components (e.g., the sensor module 676 or the communication module 690), into a volatile memory 632, may process the loaded command or data, and may store result data into a nonvolatile memory 634. According to an embodiment, the processor 1010 may include a main processor 621 (e.g., a central processing unit or an application processor) and an auxiliary processor 623 (e.g., a graphic processing device, an image signal processor, a sensor hub processor, or a communication processor), which operates independently from the main processor 621, additionally or alternatively uses less power than the main processor 621, or is specified to a designated function. In this case, the auxiliary processor 623 may operate separately from the main processor 621 or embedded.

In this case, the auxiliary processor 623 may control, for example, at least some of functions or states associated with at least one component (e.g., the display device 660, the sensor module 676, or the communication module 690) among the components of the electronic device 601 instead of the main processor 621 while the main processor 621 is in an inactive (e.g., sleep) state or together with the main processor 621 while the main processor 621 is in an active (e.g., an application execution) state. According to an embodiment, the auxiliary processor 623 (e.g., the image signal processor or the communication processor) may be implemented as a part of another component (e.g., the camera module 680 or the communication module 690) that is functionally related to the auxiliary processor 623. The memory 1030 may store a variety of data used by at least one component (e.g., the processor 1010 or the sensor module 676) of the electronic device 601, for example, software (e.g., the program 640) and input data or output data with respect to commands associated with the software. The memory 1030 may include the volatile memory 632 or the nonvolatile memory 634.

The program 640 may be stored in the memory 1030 as software and may include, for example, an operating system 642, middleware 644, or an application 646.

The input device 650 may be a device for receiving a command or data, which is used for a component (e.g., the processor 1010) of the electronic device 601, from an outside (e.g., a user) of the electronic device 601 and may include, for example, a microphone, a mouse, or a keyboard.

The sound output device 655 may be a device for outputting a sound signal to the outside of the electronic device 601 and may include, for example, a speaker used for general purposes, such as multimedia play or recordings play, and a receiver used only for receiving calls. According to an embodiment, the receiver and the speaker may be either integrally or separately implemented.

The display device 660 may be a device for visually presenting information to the user and may include, for example, a display, a hologram device, or a projector and a control circuit for controlling a corresponding device. According to an embodiment, the display device 660 may include a touch circuitry or a pressure sensor for measuring an intensity of pressure on the touch.

The audio module 670 may convert a sound and an electrical signal in dual directions. According to an embodiment, the audio module 670 may obtain the sound through the input device 650 or may output the sound through an external electronic device (e.g., the first external electronic device 602 (e.g., a speaker or a headphone)) wired or wirelessly connected to the sound output device 655 or the electronic device 601.

The sensor module 676 may generate an electrical signal or a data value corresponding to an operating state (e.g., power or temperature) inside or an environmental state outside the electronic device 601. The sensor module 676 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 677 may support a designated protocol wired or wirelessly connected to the external electronic device (e.g., the first external electronic device 602). According to an embodiment, the interface 677 may include, for example, a high-definition multimedia interface (HDMI), a universal serial bus (USB) interface, a secure digital (SD) card interface, or an audio interface.

A connecting terminal 678 may include a connector that physically connects the electronic device 601 to the external electronic device (e.g., the first external electronic device 602), for example, an HDMI connector, a USB connector, an SD card connector, or an audio connector (e.g., a headphone connector).

The haptic module 679 may convert an electrical signal to a mechanical stimulation (e.g., vibration or movement) or an electrical stimulation perceived by the user through tactile or kinesthetic sensations. The haptic module 679 may include, for example, a motor, a piezoelectric element, or an electric stimulator.

The camera module 680 may shoot a still image or a video image. According to an embodiment, the camera module 680 may include, for example, at least one lens, an image sensor, an image signal processor, or a flash.

The power management module 688 may be a module for managing power supplied to the electronic device 601 and may serve as at least a part of a power management integrated circuit (PMIC).

The battery 689 may be a device for supplying power to at least one component of the electronic device 601 and may include, for example, a non-rechargeable (primary) battery, a rechargeable (secondary) battery, or a fuel cell.

The communication module 690 may establish a wired or wireless communication channel between the electronic device 601 and the external electronic device (e.g., the first external electronic device 602, the second external electronic device 604, or the server 608) and support communication execution through the established communication channel. The communication module 690 may include at least one communication processor operating independently from the processor 1010 (e.g., the application processor) and supporting the wired communication or the wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication module) and may communicate with the external electronic device using a corresponding communication module among them through the first network 698 (e.g., the short-range communication network such as a Bluetooth, a Wi-Fi direct, or an IrDA (infrared data association)) or the second network 699 (e.g., the long-distance wireless communication network such as a cellular network, an internet, or a computer network (e.g., LAN or wide area network (WAN)). The above-mentioned various communication modules may be implemented into one chip or into separate chips, respectively.

According to an embodiment, the wireless communication module 692 may identify and authenticate the electronic device 601 using user information stored in the subscriber identification module 696 in the communication network.

The antenna module 697 may include one or more antennas to transmit or receive the signal or power to or from an external source. According to an embodiment, the communication module 690 (e.g., the wireless communication module 692) may transmit or receive the signal to or from the external electronic device through the antenna suitable for the communication method.

Some components among the components may be connected to each other through a communication method (e.g., a bus, a general purpose input/output (GIPO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 601 and the second external electronic device 604 through the server 608 connected to the second network 699. Each of the first and second external electronic devices 602 and 604 may be the same or different types as or from the electronic device 601. According to an embodiment, all or some of the operations performed by the electronic device 601 may be performed by another electronic device or a plurality of external electronic devices. When the electronic device 601 performs some functions or services automatically or by request, the electronic device 601 may request the external electronic device to perform at least some of the functions related to the functions or services, in addition to or instead of performing the functions or services by itself. The external electronic device receiving the request may carry out the requested function or the additional function and transmit the result to the electronic device 601. The electronic device 601 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B," "at least one of A or/and B," "A, B, or C," or "one or more of A, B, or/and C," and the like used herein may include any and all combinations of one or more of the associated listed items. The expressions "a first," "a second," "the first," or "the second," used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part," and "circuit." The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 640) including an instruction stored in a machine-readable storage media (e.g., an internal memory 636 or an external memory 638) readable by a machine (e.g., a computer). The machine may be a device that calls the instruction from the machine-readable storage media and operates depending on the called instruction and may include the electronic device (e.g., the electronic device 601). When the instruction is executed by the processor (e.g., the processor 1010), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory," as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a touch screen display, which is accommodated in the housing and at least part of which is exposed visually;
a microphone accommodated in the housing;
a wireless communication circuit;
a processor operatively connected to the touch screen display, the microphone, and the wireless communication circuit; and
a memory operatively connected to the processor,
wherein the memory is configured to store a software program including a user interface supporting control of at least one external device based on a user account, and store at least one instruction that, when executed, causes the processor to:
control the wireless communication circuit to receive a first user input for connecting the electronic device to a first external device, via the user interface,
control the wireless communication circuit to transmit first information corresponding to the user account and second information corresponding to the first external device, to a second external device,
control the wireless communication circuit to receive a second user input corresponding to a request for performing at least part of a task by using the first external device, via the touch screen display or the microphone,
control the wireless communication circuit to transmit data corresponding to the second user input to the second external device,
control the wireless communication circuit to receive, from the second external device, a first response including a path rule determined by the second external device among a plurality of updated path rules based on a determined user intent of the second user input and a parameter of the second user input, wherein the plurality of updated path rules are updated, by the second external device, by masking or flagging path rules operable by the electronic device, among path rules stored in the second external device and associated with a plurality of external devices, wherein the determined path rule comprises a sequence of states in which at least one of the electronic device and the first external device is to perform the requested task, and
after receiving the first response, control the first external device to perform, the at least part of the task depending on the determined path rule.

2. The electronic device of claim 1, wherein the at least one instruction further causes the processor to as at least part of the performing, control the wireless communication circuit to transmit at least one command to be used such that the at least part of the task is performed by the first external device depending on the determined path rule, to the first external device.

3. The electronic device of claim 1, wherein the at least one instruction further causes the processor to:
with regard to the execution of the at least part of the task of the first external device, control the wireless communication circuit to receive context information corresponding to the first external device from the first external device; and
control the wireless communication circuit to transmit at least part of the context information to the second external device.

4. The electronic device of claim 3, wherein the at least one instruction further causes the processor to: control the wireless communication circuit to receive a second response including the path rule based on the at least part of the context information, from the second external device.

5. The electronic device of claim 1, further comprising:
a physical button exposed to one area of the housing,
wherein the at least one instruction further causes the processor to be in a state of receiving the second user input, after receiving a third user input through the physical button.

6. The electronic device of claim 1, wherein the at least one instruction further causes the processor to:
control the wireless communication circuit to receive an issued token from a third external device associated with the software program based at least partly on the user account; and
control the wireless communication circuit to transmit the token to the first external device so as to be used for the connection between the electronic device and the first external device.

7. A server comprising:
a wireless communication circuit;
a memory configured to store states of a task; and
a processor,
wherein the processor is configured to:
control the wireless communication circuit to receive first data including first information corresponding to a first user account and second information corresponding to a first external device associated with the first user account, from a second external device,
control the wireless communication circuit to receive second data corresponding to a request that allows the first external device to perform at least part of the task, from the second external device,
in response to receiving the second data, determine a path rule among a plurality of updated path rules based on a determined user intent and a parameter of the first data, wherein the plurality of updated path rules are updated by masking or flagging path rules operable by a user terminal, among path rules stored in the memory and associated with a plurality of external devices, wherein the determined path rule comprises a sequence of states in which at least one of the user terminal and the first external device is to perform the requested task, and
control the wireless communication circuit to transmit a first response including the determined path rule to the second external device.

8. The server of claim 7,
wherein the memory is further configured to store a plurality of path rules, and
wherein the processor is further configured to identify the path rule among the stored plurality of path rules.

9. The server of claim 8, wherein the processor is further configured to assign a specified flag to the path rule, the specified flag indicating that the path rule is associated with the first user account.

10. The server of claim 8, wherein the processor is further configured to combine a first path rule with a second path rule among the stored plurality of path rules to generate the path rule.

11. The server of claim 10, wherein the processor is further configured to when a type of the first path rule corresponds to a type of the second path rule, perform the combining of the first and second path rules.

12. The server of claim 7, wherein the processor is further configured to control the wireless communication circuit to receive context information corresponding to the first external device from the second external device.

13. The server of claim 12, wherein the processor is further configured to:
change at least part of the path rule based on at least part of the context information; and
control the wireless communication circuit to transmit a second response including the changed path rule to the second external device.

14. A computer-readable storage medium storing at least one instruction which, when executed by at least one processor, causes the at least one processor to:
control to receive first data including first information corresponding to a first user account and second information corresponding to a first external device associated with the first user account, from a second external device;
control to receive second data corresponding to a request that allows the first external device to perform at least part of a task, from the second external device;
in response to receiving the second data, determine a path rule associated with at least part of the path rule of a previously stored task among a plurality of updated path rules based at least partly on a determined user intent and a parameter of the first data, wherein the plurality of updated path rules are updated by masking or flagging path rules operable by a user terminal, among path rules stored in a memory and associated with a plurality of external devices, wherein the determined path rule comprises a sequence of states in which at least one of the user terminal and the first external device is to perform the requested task; and
control to transmit a first response including the determined path rule to the second external device.

15. The computer-readable storage medium of claim 14, wherein the at least one instruction further causes the at least one processor to: identify the path rule among a previously stored plurality of path rules.

16. The computer-readable storage medium of claim 15, wherein the at least one instruction further causes the at least one processor to assign a specified flag to the path rule, the specified flag indicating that the path rule is associated with the first user account.

17. The computer-readable storage medium of claim 15, wherein the at least one instruction further causes the at least one processor to combine a first path rule with a second path rule among the stored plurality of path rules to generate the path rule.

18. The computer-readable storage medium of claim 17, wherein the at least one instruction further causes the at least one processor to determine whether a type of the first path rule corresponds to a type of the second path rule.

19. The computer-readable storage medium of claim 14, wherein the at least one instruction further causes the at least one processor to receive context information corresponding to the first external device from the second external device.

20. The computer-readable storage medium of claim 19, wherein the at least one instruction further causes the at least one processor to:
change at least part of the path rule based on at least part of the context information; and
control to transmit a second response including the changed path rule to the second external device.

* * * * *